US012545404B2

(12) United States Patent
Seki et al.

(10) Patent No.: US 12,545,404 B2
(45) Date of Patent: Feb. 10, 2026

(54) CONTROL DEVICE, UNMANNED AERIAL VEHICLE, AND CONTROL METHOD

(71) Applicant: RAKUTEN GROUP, INC., Tokyo (JP)

(72) Inventors: Tatsuhiro Seki, Tokyo (JP); Asaki Matsumoto, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 186 days.

(21) Appl. No.: 18/276,127

(22) PCT Filed: Aug. 19, 2022

(86) PCT No.: PCT/JP2022/031377

§ 371 (c)(1),
(2) Date: Aug. 7, 2023

(87) PCT Pub. No.: WO2024/038582

PCT Pub. Date: Feb. 22, 2024

(65) Prior Publication Data

US 2025/0100681 A1 Mar. 27, 2025

(51) Int. Cl.

| | |
|---|---|
| ***B64D 1/02*** | (2006.01) |
| ***B66D 1/48*** | (2006.01) |
| ***G05D 1/667*** | (2024.01) |
| ***G05D 105/28*** | (2024.01) |
| ***G05D 109/25*** | (2024.01) |

(52) U.S. Cl.

CPC ............... *B64D 1/02* (2013.01); *B66D 1/485* (2013.01); *G05D 1/667* (2024.01); *G05D 2105/28* (2024.01); *G05D 2109/254* (2024.01)

(58) Field of Classification Search

CPC . B64D 1/02; B64D 1/14; B66D 1/485; B66D 1/46; G05D 1/667; G05D 2105/28; G05D 2109/254; B64U 2101/64; B64U 2101/66; B64U 2101/67; B64U 10/13; B64C 39/02

See application file for complete search history.

(56) References Cited

U.S. PATENT DOCUMENTS

| | | | | |
|---|---|---|---|---|
| 9,174,733 | B1 * | 11/2015 | Burgess | B64D 1/12 |
| 9,346,547 | B2 * | 5/2016 | Patrick | B64U 10/14 |
| 9,969,494 | B1 * | 5/2018 | Buchmueller | G05D 1/0858 |

(Continued)

FOREIGN PATENT DOCUMENTS

| | | |
|---|---|---|
| JP | 2017-087898 A | 5/2017 |

OTHER PUBLICATIONS

International Search Report for PCT/JP2022/031377 dated Oct. 11, 2022 (PCT/ISA/210).

*Primary Examiner* — Dale W Hilgendorf
*Assistant Examiner* — Frank T Glenn, III
(74) *Attorney, Agent, or Firm* — Sughrue Mion, PLLC

(57) ABSTRACT

An unmanned aerial vehicle includes: a mooring member capable of mooring an article; a linear member connected to the mooring member; a reel around which the linear member is wound. The unmanned aerial vehicle acquires information relating to wind strength around the article when the article is to be lowered from the unmanned aerial vehicle by controlling the reel; and controls the reel so as to provide a feeding amount of the linear member in dependence on the wind strength, on the basis of the acquired information.

17 Claims, 13 Drawing Sheets

(56) References Cited

U.S. PATENT DOCUMENTS

| | | | | |
|---|---|---|---|---|
| 2017/0032315 | A1* | 2/2017 | Gupta | G06Q 10/08 |
| 2017/0137128 | A1* | 5/2017 | Natarajan | G08G 5/55 |
| 2018/0039286 | A1* | 2/2018 | Tirpak | G05D 1/042 |
| 2019/0193856 | A1* | 6/2019 | Prager | B64D 1/22 |
| 2020/0207474 | A1* | 7/2020 | Foggia | G05D 1/0676 |
| 2021/0011492 | A1* | 1/2021 | Raabe | G05D 1/0676 |
| 2021/0221500 | A1 | 7/2021 | Nakazawa et al. | |
| 2023/0406499 | A1* | 12/2023 | Woodworth | B64D 1/10 |
| 2024/0019246 | A1* | 1/2024 | Qiu | B64U 10/13 |

* cited by examiner

CONTROL DEVICE, UNMANNED AERIAL VEHICLE, AND CONTROL METHOD

CROSS REFERENCE TO RELATED APPLICATIONS

This application is a National Stage of International Application No. PCT/JP2022/031377 filed Aug. 19, 2022.

TECHNICAL FIELD

The present invention relates to the technical field of control methods and so forth for when an article being transported by an unmanned aerial vehicle is delivered.

BACKGROUND ART

Conventionally, transportation of an article to a destination by an unmanned aerial vehicle and delivery of the article from the sky have been studied. For example, Patent Literature 1 indicates that a multicopter which is transporting cargo performs hovering upon reaching a destination, and feeds a wire holding the cargo downward until the transported cargo reaches a point near the ground.

CITATION LIST

Patent Literature

Patent Literature 1: JP 2017-87898 A

SUMMARY OF INVENTION

Technical Problem

However, an article, which is suspended by a wire when the article is to be lowered from an unmanned aerial vehicle, is agitated by the wind, which sometimes makes it difficult to place the article in a designated position, for example.

Therefore, one or more embodiments of the present invention are directed to providing a control device, an unmanned aerial vehicle, and a control method that enable the effect of wind to be reduced when an article is to be lowered from the unmanned aerial vehicle.

Solution to Issue (An aspect 1) In response to the above issue, a control device according to an aspect 1 is configured to control a reel to lower an article from an unmanned aerial vehicle equipped with a mooring member enabling mooring of the article, a linear member connected to the mooring member, and the reel on which the linear member is wound. The control device includes: an acquisition unit configured to acquire information relating to wind strength around the article when the article is to be lowered; and a control unit configured to control the reel, on the basis of the information acquired by the acquisition unit, so as to provide a feeding amount of the linear member in dependence on the wind strength. This makes it possible to reduce the effect of wind when the article is to be lowered from the unmanned aerial vehicle.

(An aspect 2) In the control device according to the aspect 1, the acquisition unit is configured to acquire, as the information relating to the wind strength, a displacement amount of the article in a horizontal direction with respect to a vertical direction, taking the reel as a reference, in a state where the article is suspended by the linear member via the mooring member, and the control unit is configured to control the reel, on the basis of the displacement amount, so as to provide the feeding amount of the linear member in dependence on the displacement amount. This makes it possible to perform reel control according to the magnitude with which the article is actually agitated by the wind.

(An aspect 3) In the control device according to the aspect 2, the control unit is configured to control the reel such that the feeding amount of the linear member decreases as the displacement amount increases. Thus, the amount of agitation of the article by the wind can be reduced, and as a result, it is possible to prevent an article drop position from lying outside a range constituting a drop target.

(An aspect 4) In the control device according to the aspect 2, the acquisition unit is configured to acquire the displacement amount detected at the time of a second feeding amount of the linear member which is less than a first feeding amount thereof when the article is detached. This makes it possible to acquire the displacement amount of the article while reducing the amount the article is agitated by the wind.

(An aspect 5) In the control device according to the aspect 4, the second feeding amount is greater than a feeding amount at which the article starts to be affected by the wind. This makes it possible to acquire an appropriate displacement amount in a position where the article is as close as possible to the ground while reducing the amount of agitation of the article by the wind.

(An aspect 6) In the control device according to the aspect 4, the control unit is configured to control the reel so as to feed the linear member at a first predetermined speed to the first feeding amount in a case where the displacement amount is equal to or less than a first threshold value. Thus, the linear member can be fed until the same reaches the lowest position when the article is detached after it is confirmed that there is a low probability of the article being agitated by the wind.

(An aspect 7) In the control device according to the aspect 6, the acquisition unit is configured to acquire the displacement amount detected when the linear member is fed to the first feeding amount, and the control unit is configured to control the position of the unmanned aerial vehicle in the horizontal direction such that the article lies within a range constituting a drop target of the article, on the basis of the displacement amount detected when the linear member is fed to the first feeding amount. This makes it possible to prevent the article drop position from lying outside the range constituting the drop target.

(An aspect 8) In the control device according to the aspect 6, the acquisition unit is configured to acquire the displacement amount, which is continuously detected while the linear member is fed from the second feeding amount to the first feeding amount, and in a case where the displacement amount is greater than the first threshold value and equal to or less than a second threshold value, the control unit is configured to control the reel so as to feed the linear member at a second predetermined speed lower than the first predetermined speed and by taking the first feeding amount as a target value, unless the displacement amount exceeds the second threshold value. Thus, when there is a moderate probability of the article being agitated by the wind, the linear member can be fed until the same reaches the lowest position when the article is detached, while preventing the displacement amount of the article from exceeding a second threshold value.

(An aspect 9) In the control device according to the aspect 4, the acquisition unit is configured to acquire the displacement amount, which is continuously detected while the linear member is fed from the second feeding amount to the first feeding amount, and in a case where the displacement amount is greater than the first threshold value and equal to or less than a second threshold value, the control unit is configured to control the reel so as to feed the linear member gradually and by taking the first feeding amount as a target value, unless the displacement amount exceeds the second threshold value. Thus, when there is a moderate probability of the article being agitated by the wind, the linear member can be fed until the same reaches the lowest position when the article is detached, while preventing the displacement amount of the article from exceeding a second threshold value.

(An aspect 10) In the control device according to the aspect 8 or 9, the control unit is configured to control the position of the unmanned aerial vehicle in the horizontal direction such that the article lies within a range constituting a drop target of the article, on the basis of the displacement amount detected when the linear member is fed to the first feeding amount. Thus, even in a situation where the wind is blowing to some extent, it is possible to prevent the article drop position from lying outside the range constituting the drop target.

(An aspect 11) In the control device according to the aspect 8 or 9, the control unit is configured to control the reel so as to stop the feeding of the linear member at the moment when the displacement amount exceeds the second threshold value. This makes it possible to stop the feeding of the linear member before the article is greatly agitated.

(An aspect 12) In the control device according to the aspect 11, the control unit is configured to cause the unmanned aerial vehicle in hovering to descend on the basis of a difference between the feeding amount of the linear member when the feeding is stopped and the first feeding amount, in a case where the feeding of the linear member is stopped at a midpoint toward the first feeding amount. This makes it possible to dampen any impact which the article is subjected to at the time of the drop.

(An aspect 13) In the control device according to the aspect 12, the control unit is configured to cause the unmanned aerial vehicle to hover in a case where the altitude of the descending unmanned aerial vehicle reaches a lower limit value for safety. The control device further includes a determination unit configured to determine whether or not the article is detachable from the unmanned aerial vehicle whose altitude has reached the lower limit value for safety. Thus, by determining whether or not the article is detachable, the drop can be canceled in a case where the article would be adversely affected.

(An aspect 14) In the control device according to the aspect 13, the determination unit is configured to determine whether or not the article is detachable on the basis of a type of the article. Thus, in a case where the article is of a type that would be adversely affected by the drop, the drop can be canceled.

(An aspect 15) In the control device according to the aspect 13, the determination unit is configured to determine whether or not the article is detachable on the basis of a distance from the article to a ground. Thus, in a case where the distance from the article to the ground is a distance that would adversely affect the article, the drop can be canceled.

(An aspect 16) In the control device according to the aspect 13, the control unit is configured to cause the article to be detached from the unmanned aerial vehicle in a case where it is determined by the determination unit that the article is detachable. This makes it possible to avoid an adverse effect on the article.

(An aspect 17) In the control device according to the aspect 4, the control unit is configured to cause the unmanned aerial vehicle to fly to another location without detaching the article in a case where the displacement amount is greater than a second threshold value. This makes it possible to prevent an adverse effect on the article and the article surroundings.

(An aspect 18) An unmanned aerial vehicle according to an aspect 18 includes: a mooring member capable of mooring an article; a linear member connected to the mooring member; a reel around which the linear member is wound; an acquisition unit configured to acquire information relating to wind strength around the article when the article is to be lowered from the unmanned aerial vehicle by controlling the reel; and a control unit configured to control the reel so as to provide a feeding amount of the linear member in dependence on the wind strength, on the basis of the information acquired by the acquisition unit.

(An aspect 19) A control method according to an aspect 19 is executed by a computer for controlling a reel to lower an article from an unmanned aerial vehicle equipped with a mooring member enabling mooring of the article, a linear member connected to the mooring member, and the reel on which the linear member is wound. The control method includes: acquiring information relating to wind strength around the article when the article is to be lowered; and controlling the reel, based on the acquired information, so as to provide a feeding amount of the linear member in dependence on the wind strength.

Advantageous Effect of the Invention

According to one or more embodiments of the present invention, it is possible to reduce the effect of wind when the article is to be lowered from the unmanned aerial vehicle.

DESCRIPTION OF EMBODIMENTS

An unmanned aerial vehicle (hereinafter referred to as a "UAV (Unmanned Aerial Vehicle)") according to one or more embodiments of the present invention will be described hereinbelow with reference to the drawings.

[1. Configuration and Operation Outline of UAV 1]

Figure 1:
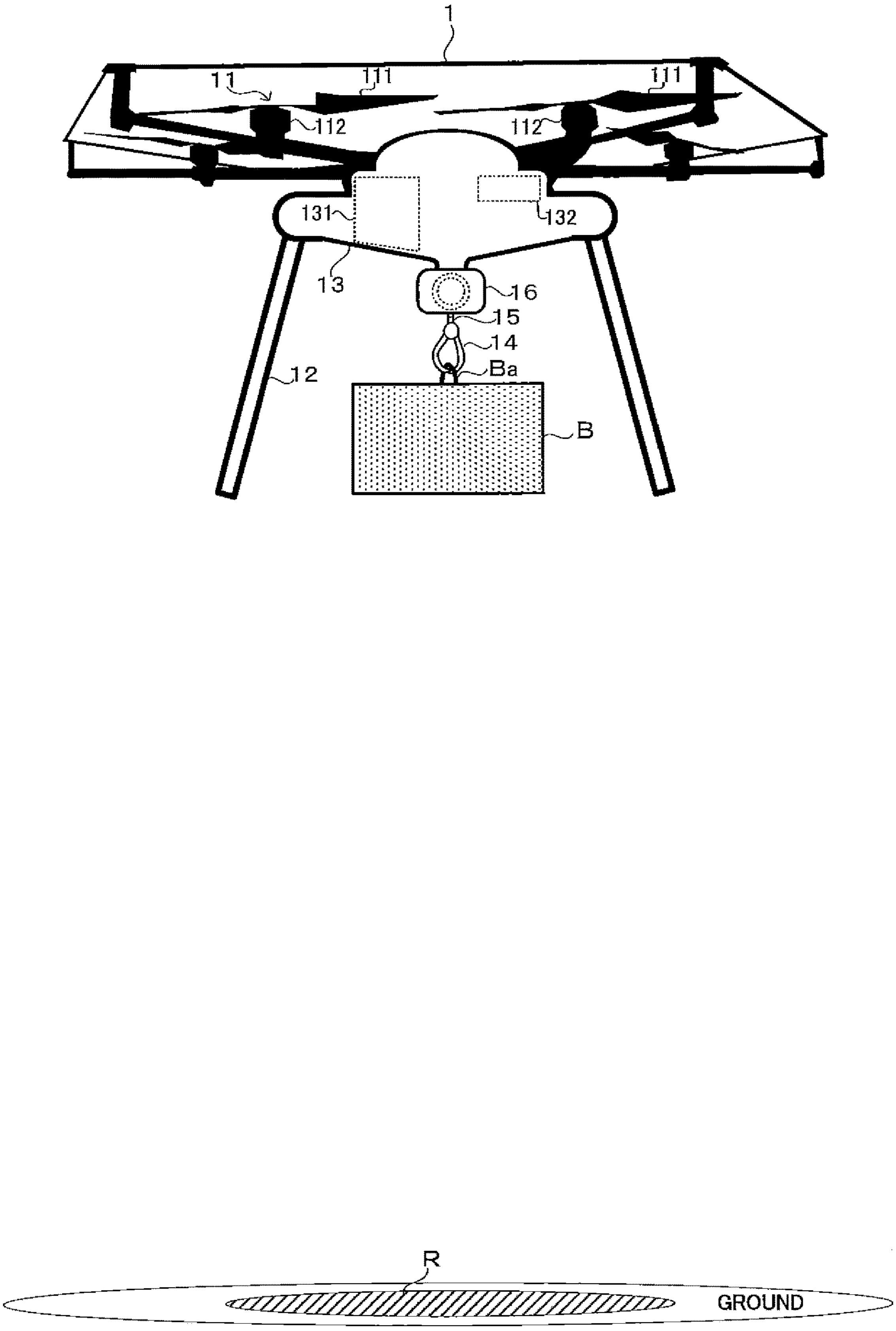
FIG. 1 is a diagram illustrating an external configuration example of an UAV 1 hovering above a delivery destination.

First, a configuration and an operation outline of a UAV 1 according to the present embodiment will be described with reference to FIG. 1 and the like. FIG. 1 is a diagram illustrating an external configuration example of the UAV 1 hovering above a delivery destination. The UAV 1 is also called a drone or a multicopter. The delivery destination is a location where an article B being delivered (transported) by the UAV 1 is delivered. For example, the delivery destination is a house where the recipient of the article B lives, an office where the recipient of the article B works, a refuge shelter, or the like. The article B being delivered as cargo (baggage) is not particularly limited, but may be, for example, an item (e.g., a product) or a parcel ordered on an EC (Electronic Commerce) site, a home delivery site, or the like, or may be relief supplies and aid supplies provided to a refuge shelter or the like. Alternatively, the article B may be a stored object (for example, a delivery box) in which one or more of the above-described items, parcels, supplies, or the like are stored.

In the UAV 1 according to the present embodiment, control is performed such that the article B is lowered by feeding (unreeling) a linear member 15 (described subsequently) from the UAV 1 hovering at the delivery destination as illustrated in FIG. 1, for example, and such that the article B is detached (separated) from the UAV 1 before the article B reaches the ground (or the rooftop surface of a building). Such control is performed so as to reduce the effect of wind when the article B is to be lowered (e.g., the article B is being lowered) from the UAV 1. As a result, when the article B detached from the UAV 1 is dropped onto the ground, the article B can be arranged within a predetermined target range R. Here, the predetermined target range R is a range serving as a drop target (in other words, the placement target) for the article B, and is a range having a certain width (surface area). For example, a region (for example, a flat region) which includes a position designated in advance by the recipient or the like of the article B may be determined as the target range R, or a region detected by sensing of the UAV 1 may be determined as the target range R.

Alternatively, in a case where a drop port (placement port) for placement of the dropped article B is provided at the delivery destination, the region of the drop port may be determined as the target range R. Incidentally, a take-off and landing port of the UAV 1 may be provided at the delivery destination. In this case, the region of the take-off and landing port may be determined as the target range R.

As illustrated in FIG. 1, the UAV 1 includes a rotor portion 11, leg portions 12, a body portion 13, a mooring member 14 capable of mooring the article B, a linear member 15 having one end connected to the mooring member 14, a winch 16 capable of feeding and rolling up the linear member 15, and the like. The rotor portion 11 includes a plurality of rotors (propellers) 111 which are horizontal rotary blades, and a rotor drive mechanism 112. The rotor drive mechanism 112 includes a rotating shaft (not illustrated) connected to the rotor 111, an actuator (not illustrated) for rotating the rotor 111 via the rotating shaft, and the like. Such an actuator (including a motor) is controlled by a control device 131 described subsequently. The leg portions 12 are used in the landing of the UAV 1. The body portion 13 includes the control device 131 and a battery 132.

The mooring member 14 is connected to a connection member Ba provided to the article B. A hook, a shackle, or the like can be used as the mooring member 14, for example. In this case, the mooring member 14 includes a detachment drive mechanism (not illustrated) for detaching the article B, which is connected via the connection member Ba such as a ring, from the mooring member 14 by means of the actuator. Alternatively, an electromagnet may be used as the mooring member 14. In this case, the mooring member 14 includes a detachment drive mechanism (not illustrated) for detaching the article B, which is connected via the connection member Ba such as a magnet, by stopping energization of an electromagnet. Incidentally, these detachment drive mechanisms are controlled by the control device 131. A rope, a wire, or the like, can be used as the linear member 15, for example. The article B is suspended by the linear member 15 via the mooring member 14.

Figure 2:
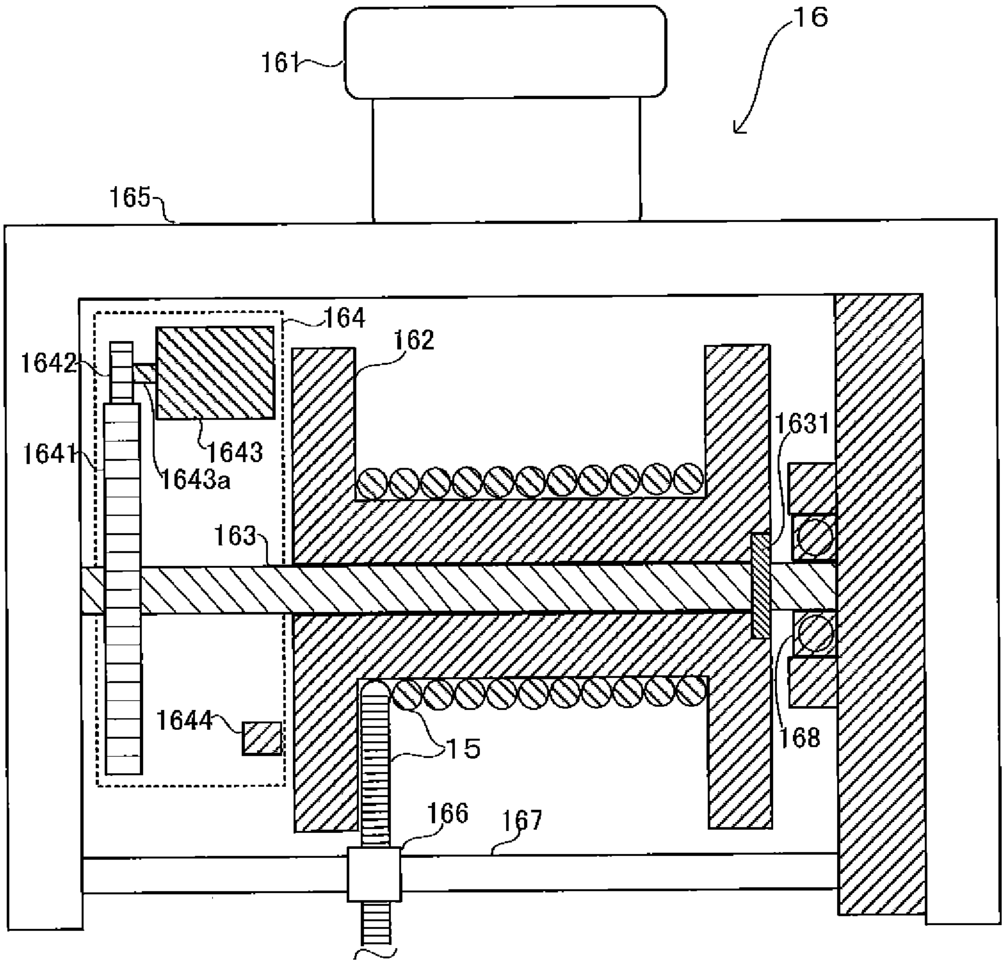
FIG. 2 is a schematic cross-sectional view illustrating a schematic configuration example of a winch 16.

FIG. 2 is a schematic cross-sectional view illustrating a schematic configuration example of the winch 16. The winch 16 is attached to the body portion 13 by an attachment portion 161 or the like, and includes a reel 162 around which the linear member 15 is wound, a rotating shaft 163 inserted through the reel 162, a reel drive mechanism 164 that rotationally drives the reel 162 and the rotating shaft 163, a casing 165, and the like. The casing 165 accommodates the reel 162, the rotating shaft 163, the reel drive mechanism 164, and the like, and directly or indirectly supports these components. An upper end portion of the casing 165 is fixed to a lower end portion of the attachment portion 161. Moreover, the casing 165 may be provided with a rod 167 to which a guide 166, through which the linear member 15 is inserted, is attached. The guide 166 reciprocates along the axial direction of the rod 167, and has a function for uniformly winding the linear member 15 around the reel 162.

The reel 162 rotates (forward rotation or reverse rotation) about the axis along with the rotational drive of the rotating shaft 163. For example, the linear member 15 wound around the reel 162 is fed from an initial position by forward rotation of the reel 162. On the other hand, the fed linear member 15 is rolled up and wound around the reel 162 by the reverse rotation of the reel 162.

Moreover, the reel 162 is preferably prevented from rotating relative to the rotating shaft 163 by an engagement member 1631 which is provided on the rotating shaft 163 so as to protrude in the radial direction. The rotating shaft 163 is rotatably supported by a bearing 168 attached to the casing 165.

The reel drive mechanism 164 includes a gear 1641, a gear 1642 that meshes with the gear 1641, a drive motor 1643 controlled by the control device 131, and the like. Incidentally, the reel drive mechanism 164 may include a gear other than the gear 1641 and the gear 1642. The center of the gear 1641 is fixed to the rotating shaft 163. Meanwhile, the center of the gear 1642 is fixed to a rotating shaft 1643*a* of the drive motor 1643.

Alternatively, the center of the gear 1642 may be connected via a shaft coupling (not illustrated). Moreover, the rotating shaft 163 is rotationally driven via the gears 1641 and 1642 together with the driving of the drive motor 1643 by the control device 131. That is, a torque (rotational force) generated by the driving of the drive motor 1643 is transmitted to the rotating shaft 163 via the gears 1641 and 1642, thus causing the reel 162 to rotate forward or backward.

Furthermore, the winch 16 is preferably provided with a camera that captures images of the area below the UAV 1 (for example, directly below the reel 162). In this case, the camera (lens) may be attached to the winch 16 such that the optical axis of the camera is oriented vertically. Moreover, the winch 16 may be provided with a feeding amount measurement sensor that measures a feeding amount of the linear member 15 from the reel 162. Here, the feeding amount of the linear member 15 is the length of the linear member 15 fed from the reel 162. Feeding amount information indicating the feeding amount (i.e., unreeling length) measured by the feeding amount measurement sensor is outputted to the control device 131. Moreover, the winch 16 may be provided with a swing angle detection sensor that detects a swing angle of the linear member 15, which has been fed from the reel 162, relative to the vertical direction. Swing angle information indicating the swing angle detected by the swing angle detection sensor is outputted to the control device 131. Moreover, the winch 16 may be provided with a reel rotation lock mechanism that locks the rotation of the reel 162 and the rotating shaft 163. The reel rotation lock mechanism is controlled by the control device 131.

Figure 3:
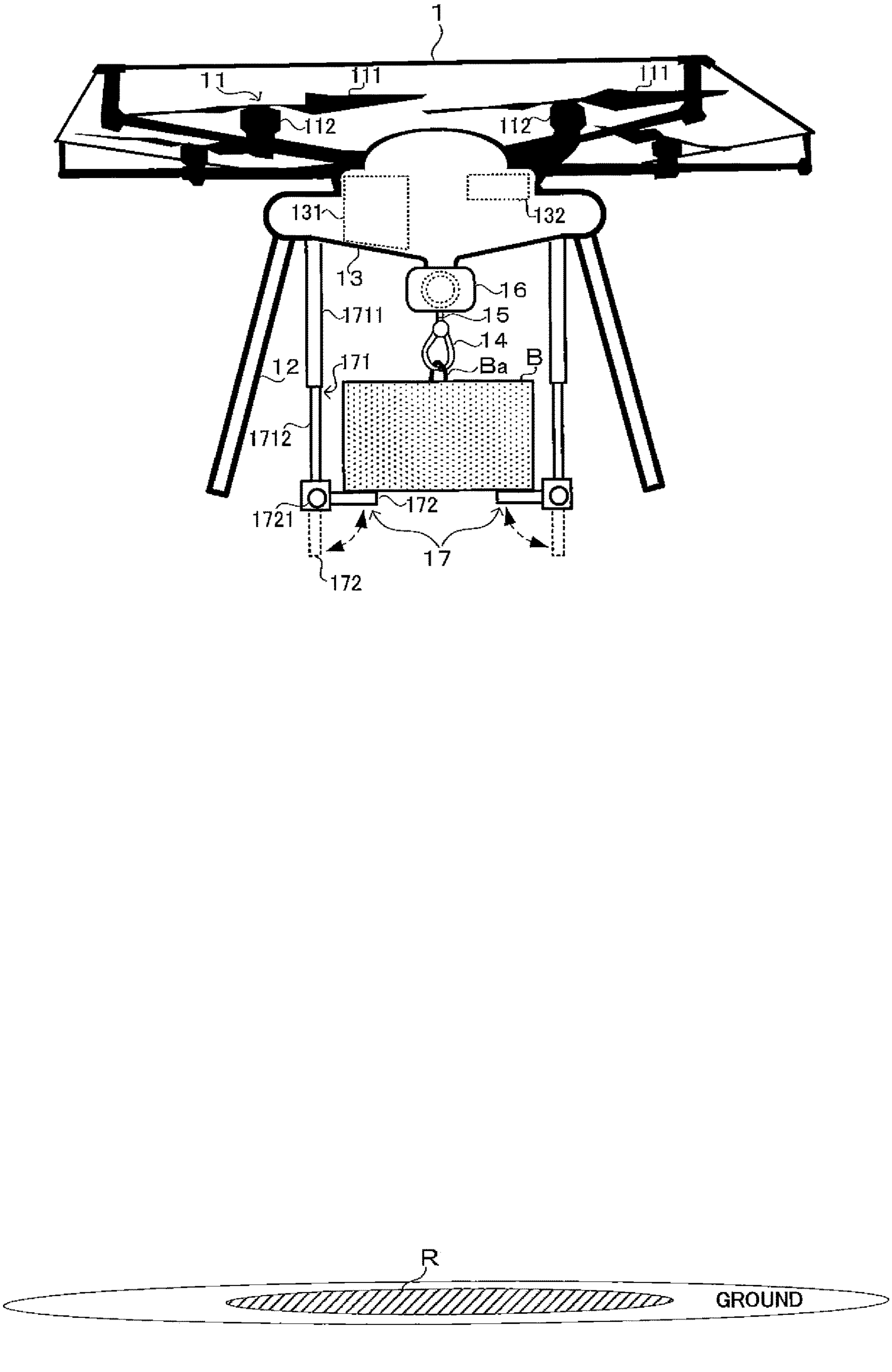
FIG. 3 is a diagram illustrating an external configuration example of the UAV 1 including an article-holding mechanism 17.

Incidentally, in addition to the above-described components, the UAV 1 may include an article-holding mechanism for holding the article B. FIG. 3 is a diagram illustrating an external configuration example of the UAV 1 including an article-holding mechanism 17. The article-holding mechanism 17 includes an extendable member 171, a movable holder 172, an actuator (not illustrated), and the like. The extendable member 171 includes, for example, a hollow upper member 1711 and a lower member 1712 connected to be insertable into the upper member 1711. An upper end portion of the upper member 1711 is fixed to the body portion 13, and a lower end portion of the lower member 1712 is fixed to the movable holder 172. The lower member 1712 is inserted into the hollow portion of the upper member 1711 under the control of the control device 131, in a state where the article B is not held. The movable holder 172 can be opened and closed, as indicated by a broken line arrow, about the rotating shaft 1721 under the control of the control device 131. The movable holder 172 holds (supports) the article B (bottom portion) in a closed state as indicated by the solid line in FIG. 3. The article B is thus prevented from being lowered. On the other hand, when the movable holder 172 is in an open state as indicated by the broken line in FIG. 3, the holding of the article B is released.

Figure 4:
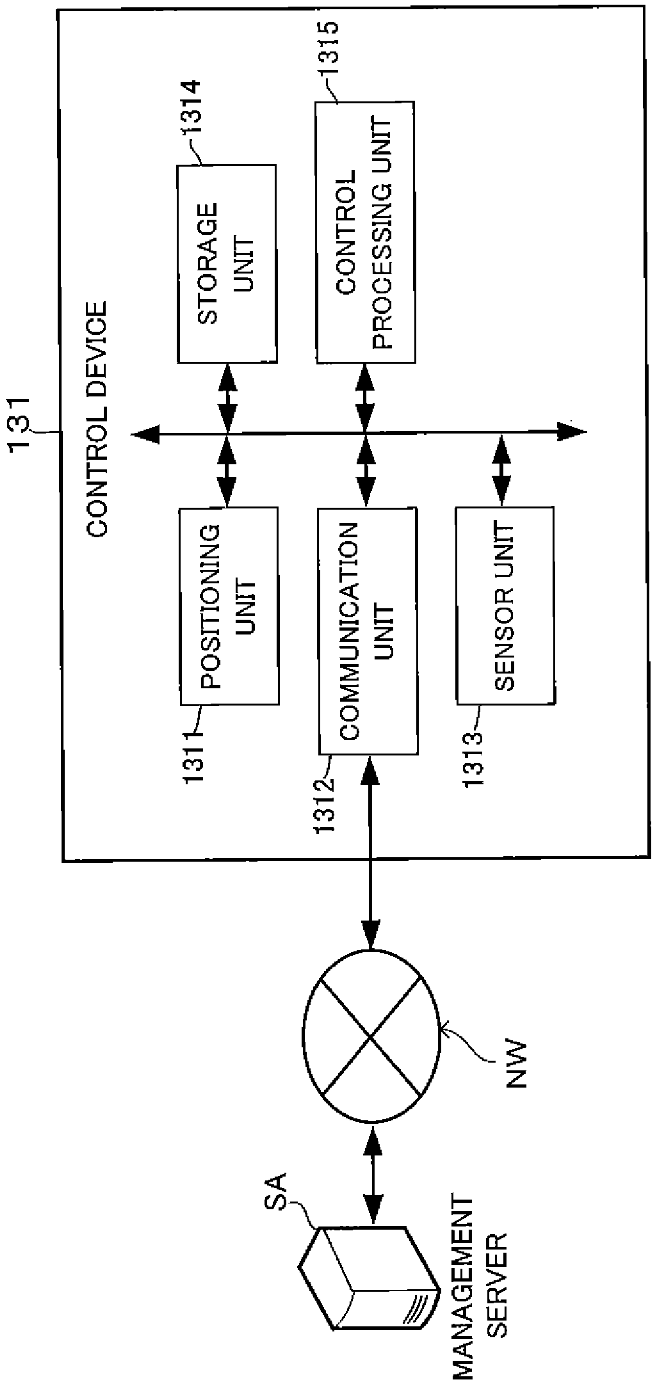
FIG. 4 is a diagram illustrating a schematic configuration example of a control device 131.

FIG. 4 is a diagram illustrating a schematic configuration example of the control device 131. The control device 131 is configured to control the reel 162 to lower the article B from the UAV 1. The control device 131 includes a positioning unit 1311, a communication unit 1312, a sensor unit 1313, a storage unit 1314, a control processing unit 1315, and the like, and power is supplied to these units from the battery 132. The positioning unit 1311 includes a radio wave receiver, an altitude sensor, and the like. The positioning unit 1311 uses a radio receiver to receive, for example, radio waves transmitted from a GNSS (Global Navigation Satellite System) satellite, and, on the basis of the radio waves, detects the current position (latitude and longitude) of the UAV 1 in a horizontal direction. Position information indicating the current position detected by the positioning unit 1311 is outputted to the control processing unit 1315.

Furthermore, the positioning unit 1311 may detect the current position (altitude) of the UAV 1 in the vertical direction by using an altitude sensor such as an atmospheric pressure sensor. In this case, the position information includes altitude information indicating the altitude of the UAV 1.

The communication unit 1312 has a radio communication function and is responsible for controlling communication that is performed via a communication network NW. The communication network NW includes, for example, the Internet, a mobile communication network, a radio base station thereof, and the like. The UAV 1 is capable of communicating with a management server SA connected to the communication network NW via the communication unit 1312. The management server SA is a server that manages delivery of the article B. The management server SA is capable of managing and controlling the UAV 1. Moreover, the communication unit 1312 is capable of performing near field communication with a mobile terminal (not illustrated) which is used by the recipient of the article B.

The sensor unit 1313 includes various sensors used for flight control of the UAV 1 and the like. Examples of the various sensors include an optical sensor, a triaxial angular velocity sensor, a triaxial acceleration sensor, and a geomagnetic sensor, and the like. The optical sensor includes a camera (for example, an RGB camera), and continuously images a real space within a range lying within the viewing angle of the camera. Moreover, the optical sensor may include a camera that captures images of the area below the UAV 1, as described above. The sensing information sensed (for example, imaged, measured, or the like) by the sensor unit 1313 is outputted to the control processing unit 1315. The sensing information includes images captured by the camera, and the like. The sensing information may be sequentially transmitted to the management server SA by the communication unit 1312 together with a vehicle ID of the UAV 1. The vehicle ID of the UAV 1 is identification information for identifying the UAV 1.

Moreover, the optical sensor may include a distance sensor capable of measuring, together with the camera, the distance to the ground. As the distance sensor, for example, a LiDAR (Light Detection and Ranging, or Laser Imaging Detection and Ranging) sensor can be used. Alternatively, as the distance sensor, a meter for measuring distance by measuring the time from when near infrared rays are emitted until the light is reflected from the ground and returns can be used. Moreover, the sensor unit 1313 may include a wind force sensor (for example, an anemometer) that detects (measures) the wind force amount around the article B. In this case, the sensing information includes the wind force amount detected by the wind force sensor.

Figure 5:
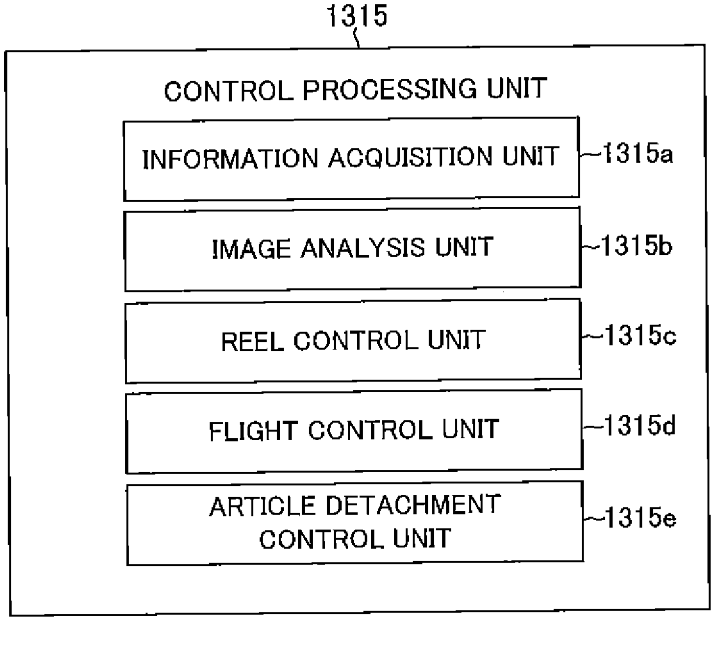
FIG. 5 is a diagram illustrating an example of functional blocks in a control processing unit 1315.

The storage unit 1314 includes a nonvolatile memory or the like, and stores various programs and data. Moreover, the storage unit 1314 stores the vehicle ID of the UAV 1. The control processing unit 1315 includes a CPU (Central Processing Unit), a ROM (Read Only Memory), a RAM (Random Access Memory, and the like, and executes various processing according to a program stored in the ROM (or the storage unit 1314). Incidentally, the control processing unit 1315 is electrically connected to the rotor drive mechanism 112, the reel drive mechanism 164, and the like. FIG. 5 is a diagram illustrating an example of functional blocks in the control processing unit 1315. As illustrated in FIG. 5, the control processing unit 1315 functions as an information acquisition unit 1315*a* (an example of an acquisition unit), an image analysis unit 1315*b*, a reel control unit 1315*c* (an example of a control unit), a flight control unit 1315*d* (an example of a control unit), an article detachment control unit 1315*e* (an example of a control unit and a determination unit), and the like, in accordance with a program (program code group) stored in, for example, the ROM or the storage unit 1314.

The information acquisition unit 1315*a* acquires wind force information which is used in reel control by the reel control unit 1315*c*. Here, the wind force information is information (that is, a parameter for reel control) relating to the wind strength around the article B when the article B is to be lowered (e.g., the article B is being lowered). The wind force information may also be a wind force amount which is detected by a wind sensor included in the UAV 1. However, the wind force information is desirably the displacement amount of the article B in a horizontal direction with respect to the vertical direction, taking the reel 162 as a reference. Because the wind force amount detected by the wind force sensor is not necessarily an amount indicating the wind strength at the altitude at which the article B being lowered is actually located, and the amount of agitation of the article B varies (for example, the lighter the weight, the more likely it is to be inflated) even with the same wind force amount depending on the weight of the article B, the estimation accuracy of the amount of agitation of the article B in dependence on the wind strength may be low. In contrast, because the displacement amount of the article B is an amount reflecting the wind strength at the altitude at which the article B is actually located and is an amount corresponding to the weight of the article B, the estimation accuracy of the amount of agitation of the article B in dependence on the wind strength can be enhanced. Incidentally, the displacement amount of the article B may be a parameter indicating the magnitude of the displacement, or may be a parameter indicating the magnitude and direction of the displacement.

Figure 6:
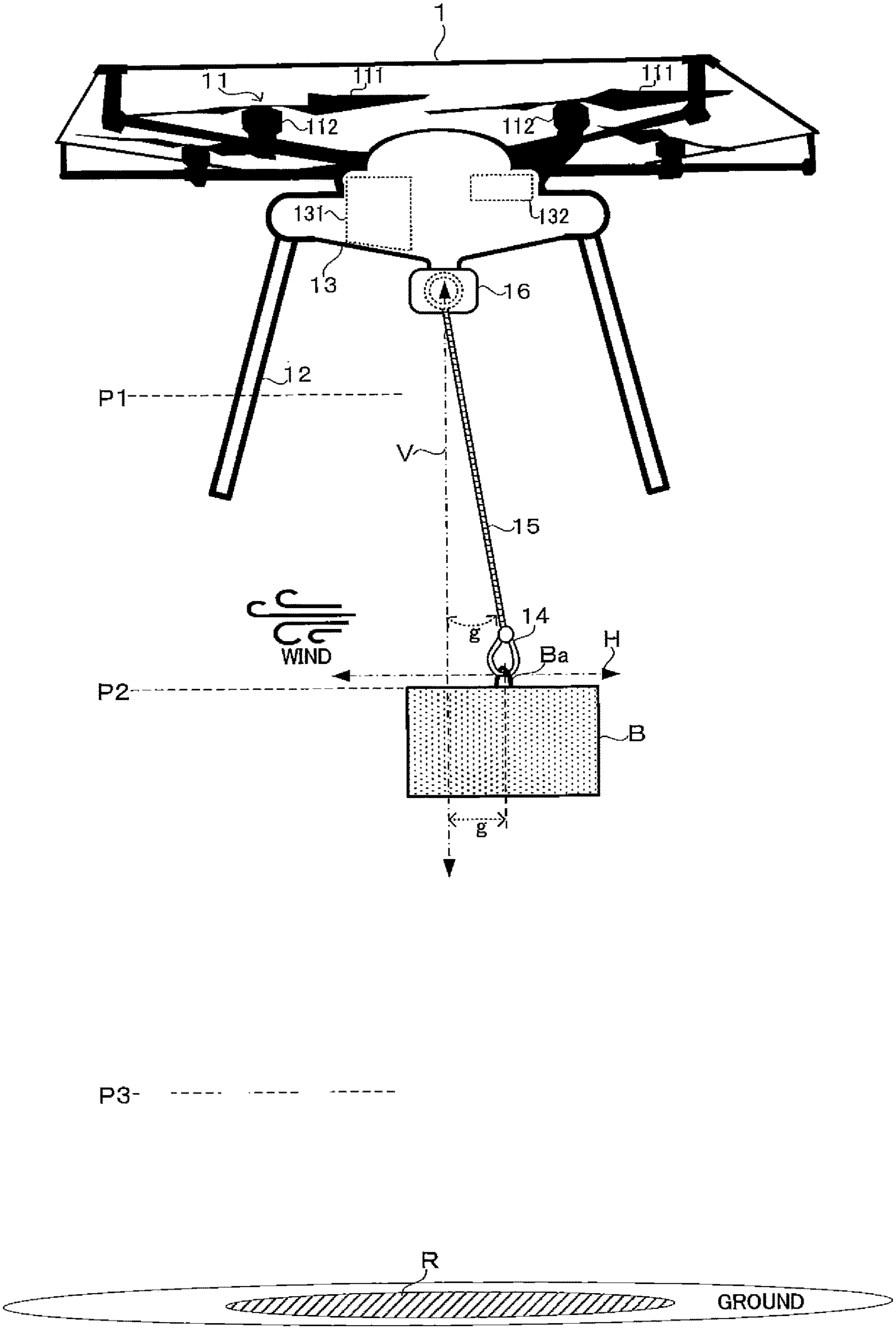
FIG. 6 is a diagram illustrating an aspect in which an article B being lowered from the UAV 1 is agitated by wind.

FIG. 6 is a diagram illustrating an aspect in which the article B being lowered from the UAV 1 is agitated by the wind. As illustrated in FIG. 6, in a state where the article B is suspended by the linear member 15, "the displacement amount g of article B" detected in the horizontal direction H with respect to a vertical direction V, taking the reel 162 as a reference, is acquired as the wind force information. Here, the state in which the article B is suspended by the linear member 15 is, for example, a state in which the linear member 15 is fed by a minimum feeding amount or more at which the article B starts to be affected by the wind. The displacement amount g of the article B is preferably detected by, for example, the image analysis unit 1315*b* analyzing an image of the area below the UAV 1 (for example, directly below the reel 162), which is captured by the camera of the sensor unit 1313. In this case, the information acquisition unit 1315*a* acquires the displacement amount g of the article B from the image analysis unit 1315*b*.

For example, the image analysis unit 1315*b* may extract a straight line (vector) extending in the vertical direction V from the reel 162 and a straight line (vector) corresponding to the linear member 15 fed from the reel 162, in an image obtained by capturing an image of the area below the UAV 1, and may detect an angle formed by the extracted two straight lines as the displacement amount g of the article B. Alternatively, in a case where the direction of the straight line extending from the reel 162 to the center point of the target range R coincides with the vertical direction V, the image analysis unit 1315*b* may detect, as the displacement amount g of the article B, the number of pixels between the center point of the target range R and the article B (for example, the connection member Ba). The number of pixels corresponds to the length between the center point of the target range R and the article B.

Moreover, the image analysis unit 1315*b* may detect the displacement amount g of the article B on the basis of a plurality of images obtained by continuously capturing images of the area below the UAV 1 in a predetermined time (for example, from one second to ten seconds). In this case, the information acquisition unit 1315*a* acquires, as the wind force information used in reel control, the maximum displacement amount g (max) among the "displacement amounts g of article B" as detected by the image analysis unit 1315*b* from each image in a predetermined time. Alternatively, an average of the "displacement amounts g of article B" detected from each image may be acquired as the wind force information used in reel control. Incidentally, the displacement amount g of the article B may be a swing angle of the linear member 15, which has been fed from the reel 162, relative to the vertical direction V. In this case, the information acquisition unit 1315*a* acquires the swing angle from the swing angle detection sensor as the displacement amount g of the article B.

Moreover, the information acquisition unit 1315*a* may acquire a "displacement amount g of article B" which is detected at the time of a midpoint feeding amount (an example of the second feeding amount) that is less than a maximum feeding amount (an example of the first feeding amount) of the linear member 15 when the article B is to be detached, and that is greater than the aforementioned minimum feeding amount. Thus, it is possible to acquire an appropriate displacement amount g in a position (at an altitude) where the article B is as close as possible to the ground while reducing the amount of agitation of the article B by the wind. For example, in the example of FIG. 6, when the displacement amount g of the article B is detected in the article position P1 (for example, at the altitude of the upper surface of the article at the minimum feeding amount) when the article B starts to be affected by the wind, because the article B is far from the ground, it may not be an appropriate displacement amount g reflecting the wind strength near the ground. However, by detecting the displacement amount g of the article B when the linear member 15 is fed to the midpoint article position P2 (for example, the altitude of the upper surface of the article at the time of the midpoint feeding amount) before reaching the article position P3 (for example, the altitude of the upper surface of the article at the time of the maximum feeding amount) when the article B is to be detached, it is possible to acquire an appropriate displacement amount g in the position where the article B is as close as possible to the ground.

On the other hand, in the example of FIG. 6, if the linear member 15 is fed, at the time of strong wind, to the article position P3 when the article B is to be detached, the amount of agitation of the article B will be maximum, and there will likely be an adverse effect on the article B and on the surroundings of the article B (for example, a man-made object or the like). Therefore, it may be necessary to temporarily return the fed linear member 15 to the point of origin. However, by detecting the displacement amount g of the article B when the linear member 15 is fed to the midpoint article position P2 before reaching the article position P3 when the article B is to be detached, it is possible to reduce the amount of agitation of the article B by the wind, and as a result, it is possible to prevent an adverse effect on the article B and on the surroundings of the article B. Incidentally, the information acquisition unit 1315*a* may acquire the "displacement amount g of article B", which is continuously detected while the linear member 15 is fed from the minimum feeding amount to the maximum feeding amount.

The reel control unit 1315*c* controls (reel-controls) the reel 162 so as to provide a feeding amount (that is, the feeding amount of the linear member 15) in dependence on wind strength in a state where the UAV 1 is hovering, on the basis of the wind force information (for example, the wind force amount or the displacement amount g of the article B) acquired by the information acquisition unit 1315*a*. As a result, it is possible to reduce the effect of wind when the article B is to be lowered (e.g., the article B is being lowered) from the UAV 1, and thus, it is possible to reduce the difficulty of dropping the article B within the target range R (for example, in the designated position).

Incidentally, in reel control, correspondence relationships between feeding amount(s) of the linear member 15 and speed(s) of rotation (which may be the rotation angle) of the reel 162 are preferably determined in advance. For example, the rotation speed "0.05 (18 degrees)" is associated with the feeding amount "x cm". In this case, the reel control unit 1315*c* outputs, to the reel drive mechanism 164, a control signal for forward-rotating the reel 162 by the speed of rotation corresponding to the feeding amount in dependence on wind strength, in accordance with the correspondence relationships. As a result, the drive motor 1643 in the reel drive mechanism 164 is driven, thereby feeding the linear member 15 from the reel 162 according to the feeding amount. As described above, in a case where the linear member 15 is fed from the reel 162, the rotation of the reel 162 may be locked by the reel rotation lock mechanism in order to maintain the fed state.

In a case where the displacement amount g of the article B is used as the wind force information, the reel control unit 1315*c* controls the reel 162 so as to provide the feeding amount corresponding to the displacement amount g of the article B in a state where the UAV 1 is hovering. Here, the feeding amount corresponding to the displacement amount g of the article B can be referred to as the feeding amount in dependence on wind strength. In this manner, by using the displacement amount g of the article B as an indicator for the wind strength, it is possible to perform reel control according to the size of the article B actually blown by the wind. For example, the reel control unit 1315*c* controls the reel 162 such that the feeding amount of the linear member 15 decreases as the displacement amount g of the article B increases (i.e., such that the larger the displacement amount g, the smaller the feeding amount of the linear member 15). That is, by shortening the linear member 15 that suspends the article B as the displacement amount g of the article B increases, the amount of agitation of the article B by the wind can be reduced, and as a result, it is possible to prevent the article drop position from lying outside the target range R.

For example, in a case where the "displacement amount g of article B" detected at the time of the midpoint feeding amount (or the minimum feeding amount) that is less than the maximum feeding amount of the linear member 15 when the article B is to be detached is equal to or less than the first threshold value, the reel control unit 1315*c* controls the reel 162 to feed the linear member 15 to the maximum feeding amount. Thus, a linear member 15 can be fed until same reaches the lowest position (for example, the altitude of the upper surface of the article at the time of the maximum feeding amount) when the article B is to be detached after it is confirmed that there is a low probability of the article B being agitated by the wind. Here, the first threshold value is the threshold value when it is assumed that the wind around the article B is non-existent or a weak wind, in which case there is a low probability of agitation of the article B. That is, when the displacement amount g of the article B is equal to or less than the first threshold value, the wind is regarded as non-existent or a weak wind.

On the other hand, in a case where the displacement amount g of the article B is greater than the first threshold value and equal to or less than the second threshold value, the reel control unit 1315*c* controls the reel 162 so as to gradually feed the linear member 15 by taking the maximum feeding amount as a target value, unless the displacement amount g of the article B exceeds the second threshold value. Thus, when there is a moderate probability of the article B being agitated by the wind, the linear member 15 can be fed until same reaches the lowest position when the article B is to be detached, while preventing the displacement amount g of the article B from exceeding a second threshold value. Here, the second threshold value is the threshold value when it is assumed that the wind around the article B is a moderate wind, in which case there is a higher probability of agitation of the article B than with a weak wind. That is, when the displacement amount g of the article B is greater than the first threshold value and equal to or less than the second threshold value, the wind is regarded as moderate. On the other hand, when the displacement amount g of the article B is greater than the second threshold value, the wind is regarded as strong, in which case there is a higher probability of agitation of the article B than with a moderate wind. While the linear member 15 is being gradually fed, the reel control unit 1315*c* controls the reel 162 so as to stop the feeding of the linear member 15 at the moment when the displacement amount g of the article B exceeds the second threshold value. Thus, the feeding of the linear member 15 can be stopped before the article B is greatly agitated.

Moreover, the reel control unit 1315*c* may perform control so as to change the feeding speed of the linear member 15 depending on whether or not the displacement amount g of the article B is equal to or less than the first threshold value. For example, in a case where the displacement amount g of the article B is equal to or less than the first threshold value, the reel control unit 1315*c* controls the reel 162 so as to feed the linear member 15 at a high speed (an example of a first predetermined speed) to the maximum feeding amount. On the other hand, in a case where the displacement amount g of the article B is greater than the first threshold value and equal to or less than the second threshold value, the reel control unit 1315*c* controls the reel 162 such that the linear member 15 is slowly fed at a low speed (an example of a second predetermined speed lower than the first predetermined speed) by taking the maximum feeding amount as a target value, unless the displacement amount g of the article B exceeds the second threshold value. As a result, even if there is a gust of wind while the linear member 15 is being fed, it is possible to prevent the article B from being agitated greatly. Incidentally, in a case where the displacement amount g of the article B is greater than the second threshold value, the control processing unit 1315 causes the UAV 1 to fly to another location (for example, return to a distribution base) without detaching the article B. Thus, an adverse effect on the article B and the surroundings of article B can be prevented.

The flight control unit 1315*d* performs flight control of the UAV 1. In such flight control, the flight control unit 1315*d* outputs a control signal for rotating one or more rotors 111 to the rotor drive mechanism 112 on the basis of the position information acquired from the positioning unit 1311 and the sensing information acquired from the sensor unit 1313. As a result, the position, posture, and direction of travel of the UAV 1 can be controlled. Here, the control in the direction of travel includes control to stop the UAV 1 in the air such that same does not travel (that is, hovering control). The flight control unit 1315*d* is capable of causing the UAV 1 to fly autonomously to the delivery destination on the basis of the delivery destination information acquired from the management server SA by the information acquisition unit 1315*a*, for example. Incidentally, the delivery destination information includes position information (latitude and longitude) of the delivery destination. Moreover, the delivery destination information may also include position information of the target range R described above.

Moreover, in a case where the linear member 15 is fed to the maximum feeding amount in a state where the UAV 1 is hovering under the hovering control, the flight control unit 1315*d* controls the position of the UAV 1 in the horizontal direction such that the article B lies within the target range R on the basis of the "displacement amount g of article B" detected at this time. That is, the flight control unit 1315*d* moves the UAV 1 in the horizontal direction such that the article B lies within the target range R. Thus, even in a situation where the wind is blowing to some extent, it is possible to prevent the article drop position from lying outside the target range R (for example, the designated position).

Figure 7:
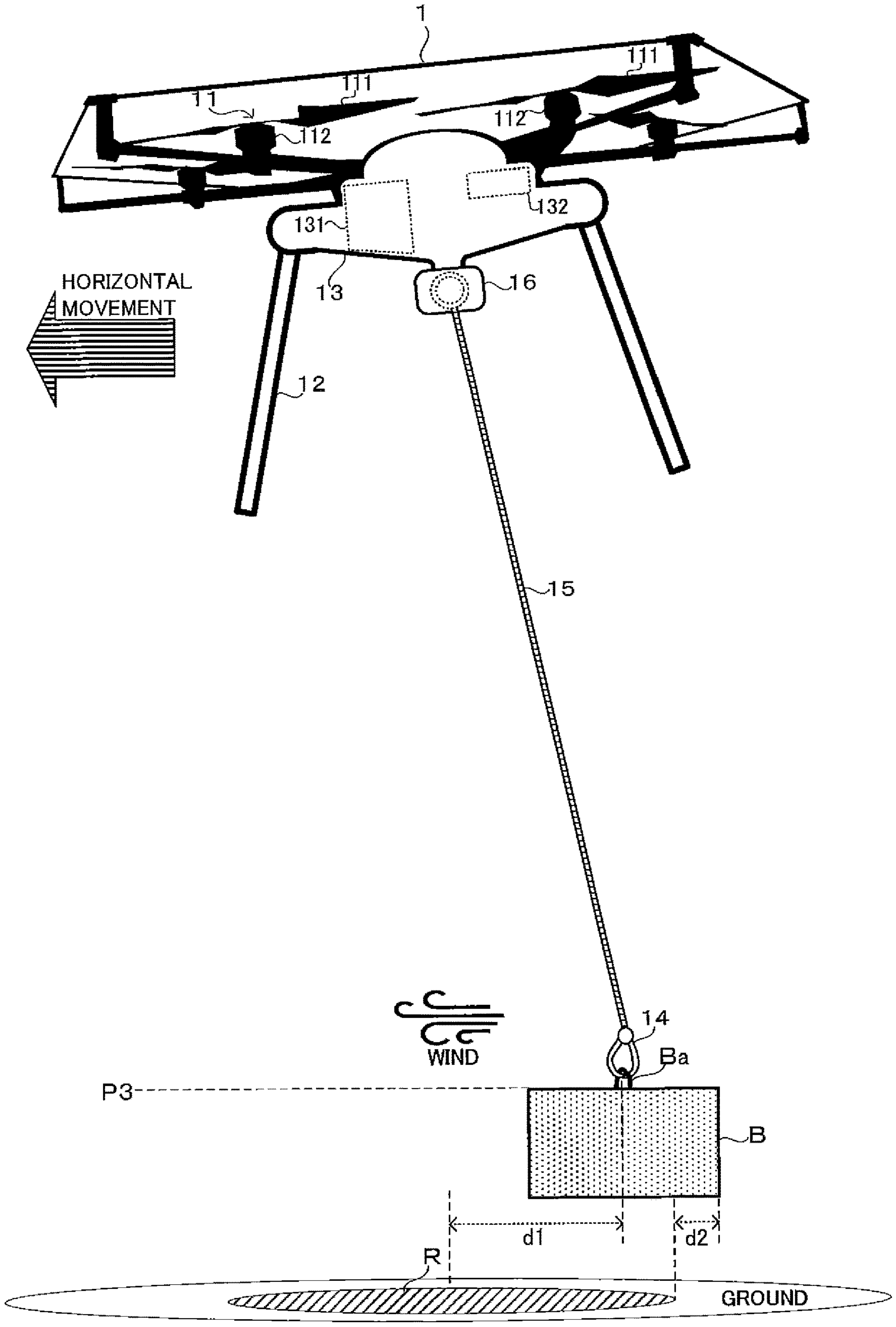
FIG. 7 is a diagram illustrating a state in which the UAV 1 moves horizontally such that the article B lies within a target range R.
Figure 8:
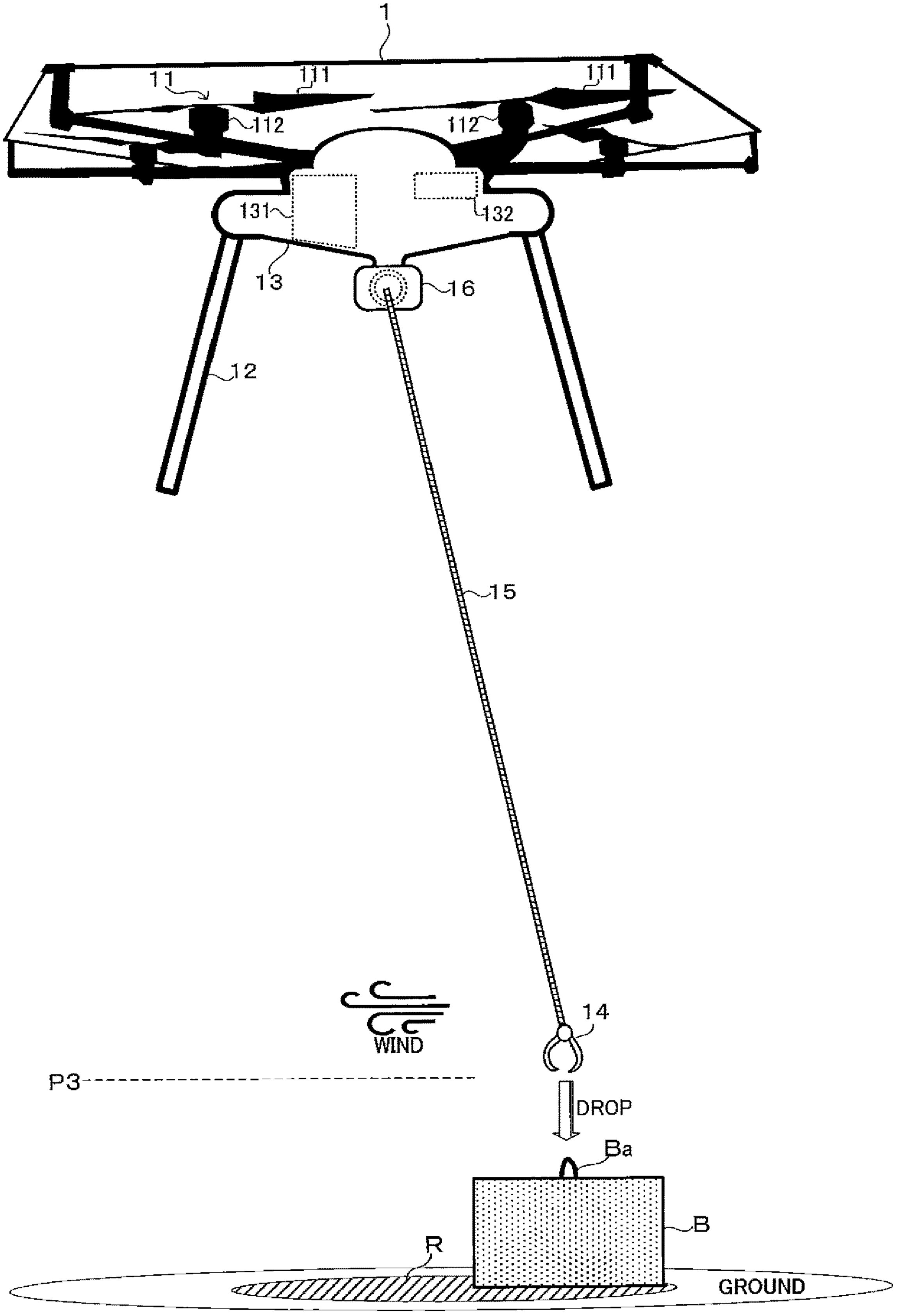
FIG. 8 is a diagram illustrating a state in which the article B is dropped within the target range R after the UAV 1 has moved horizontally.

FIG. 7 is a diagram illustrating a state in which the UAV 1 moves horizontally such that the article B lies within the target range R. In the example of FIG. 7, because the portion of the article B lies outside the target range R as the article B is agitated rightward by the wind, the UAV 1 is moved leftward horizontally by the distance d1 or d2 such that the article B lies within the target range R, for example. Here, the distance d1 and the direction to be moved are calculated on the basis of the displacement amount g detected at this time. Incidentally, the distance d1 may be a value obtained by converting the displacement amount g into a distance. Meanwhile, the distance d2 and the direction to be moved may be calculated by the image analysis unit 1315*b* analyzing an image of the area below the UAV 1, which is captured by the camera of the sensor unit 1313. In this case, for example, the image analysis unit 1315*b* compares the target range R appearing in the image captured by the camera with the planar size of each article B, and thus calculates the distance d2 at which the article B lies within the target range R. On the other hand, FIG. 8 is a diagram illustrating a state in which the article B is dropped within the target range R after the UAV 1 has moved horizontally. Incidentally, the dropping of the article B illustrated in FIG. 8 is performed by the article B being detached from the mooring member 14 by the article detachment control unit 1315*e*.

Figure 9:
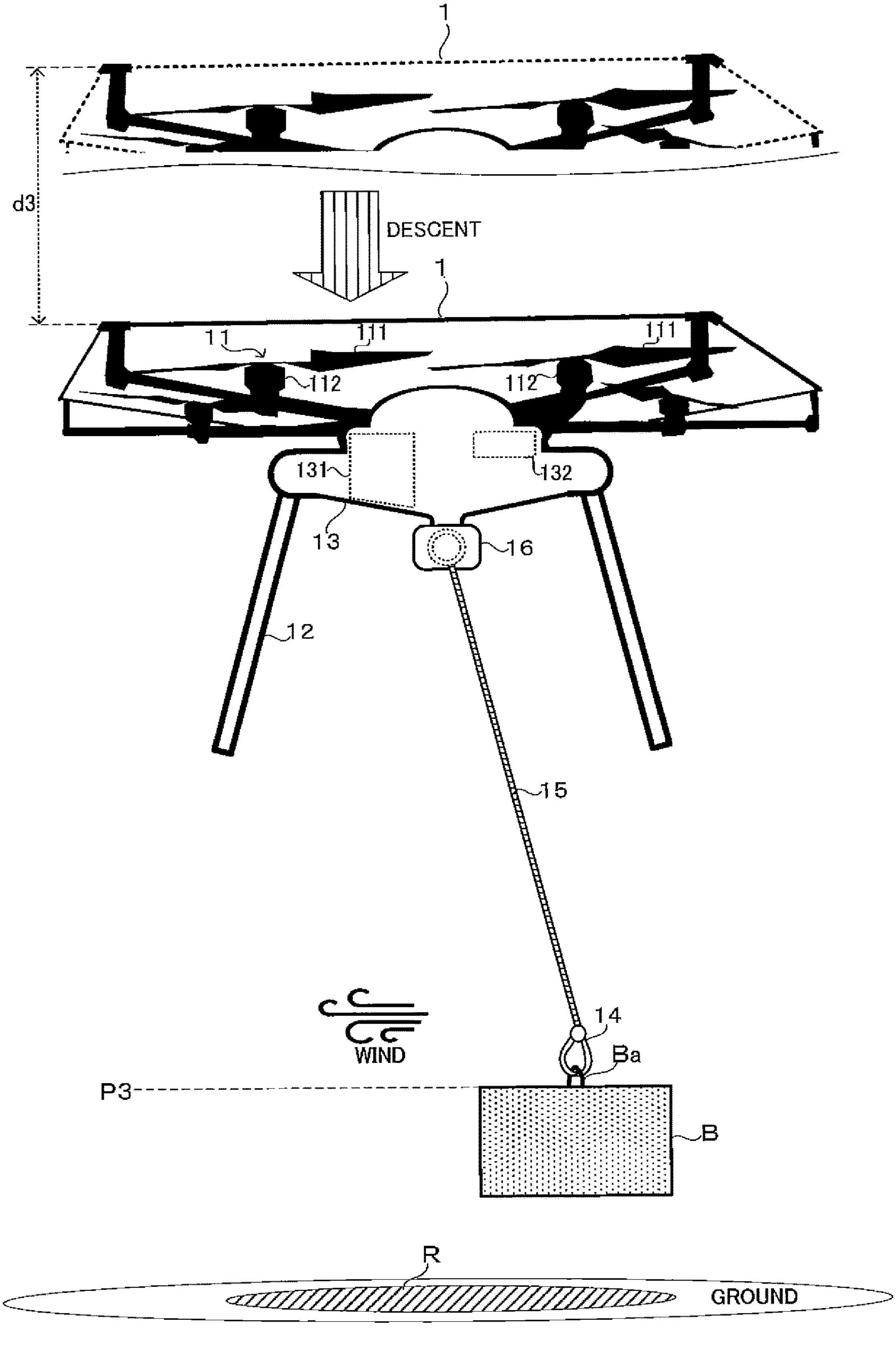
FIG. 9 is a diagram illustrating a state in which the UAV 1 is made to descend by a distance d3 after feeding of a linear member 15 is stopped at a midpoint.

On the other hand, in a case where the feeding of the linear member 15 is stopped at a midpoint toward the maximum feeding amount in a state where the UAV 1 is hovering under the hovering control, the flight control unit 1315*d* causes the hovering UAV 1 to descend by a distance corresponding to the difference between the feeding amount of the linear member 15 and the maximum feeding amount at the time of the stop, on the basis of the difference. Thus, any impact which the article B is subjected to at the time of the drop can be dampened. FIG. 9 is a diagram illustrating a state in which the UAV 1 is made to descend by the distance d3 after the feeding of the linear member 15 is stopped at a midpoint. Here, the distance d3 is a distance corresponding to a difference, when the feeding is stopped, between the feeding amount of the linear member 15 and the maximum feeding amount. Incidentally, as illustrated in FIG. 9, in a state where the UAV 1 is made to descend by the distance d3, the article B is detached from the mooring member 14 by the article detachment control unit 1315*e*, and thus the article B is dropped within the target range R. Also in this case, if a portion of the article B is outside the target range R, the article B is dropped after the UAV 1 moves horizontally such that the article B lies within the target range R.

Figure 10:
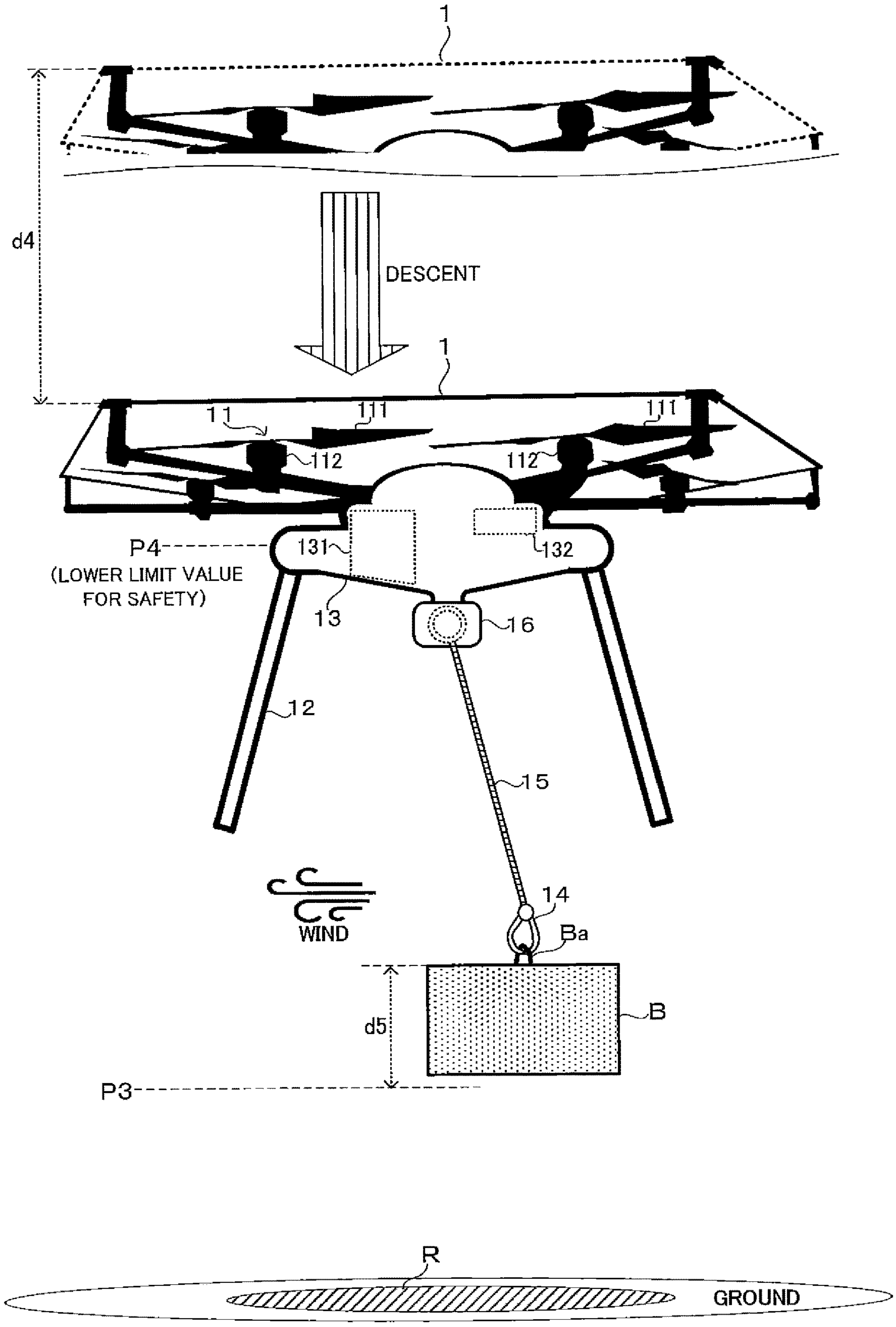
FIG. 10 is a diagram illustrating a state in which the UAV 1 is made to descend by the distance d4 to the lower limit value for safety after the feeding of the linear member 15 is stopped at a midpoint.

By the way, depending on the delivery destination, a lower limit value (this is referred to as the "lower limit value for safety") of the altitude permitted for the UAV 1 may be determined in advance for safety reasons. In this case, in the UAV 1, information indicating a lower limit value for safety is acquired from the management server SA by the information acquisition unit 1315*a*, for example, and set in the flight control unit 1315*d*. Further, as described above, in a case where the altitude of the UAV 1, which is being made to descend on the basis of the difference when the feeding is stopped between the feeding amount of the linear member 15 and the maximum feeding amount, reaches the lower limit value for safety (for example, several meters from the ground), the flight control unit 1315*d* stops the descent of the UAV 1 and causes same to hover. FIG. 10 is a diagram illustrating a state in which the UAV 1 is made to descend by the distance d4 to the lower limit value for safety after the feeding of the linear member 15 is stopped at a midpoint. In this case, as will be described below, it is determined whether or not the article B is detachable.

The article detachment control unit 1315*e* causes the article B to be detached from the UAV 1 (mooring member 14) in a state where the linear member 15 is fed to the maximum feeding amount. Such detachment is performed when a control signal for detaching the article B from the mooring member 14 is outputted from the article detachment control unit 1315*e* to the detachment drive mechanism. At this time, in a case where a portion of the article B is outside the target range R, the article detachment control unit 1315*e* causes the article B to be detached from the UAV 1 as illustrated in FIG. 8 after the UAV 1 moves horizontally such that the article B lies within the target range R, as illustrated in FIG. 7. Moreover, as illustrated in FIG. 9, the article detachment control unit 1315*e* causes the article B to be detached from the UAV 1 in a state where the UAV 1 is made to descend by the distance d3 from a state where the feeding of the linear member 15 is stopped at a midpoint. On the other hand, as illustrated in FIG. 10, in a case where the descent of the UAV 1 has stopped due to the altitude of the UAV 1 reaching the lower limit value for safety, the article detachment control unit 1315*e* determines whether or not the article B is detachable from the UAV 1 (that is, the UAV 1 at an altitude which has reached the lower limit value for safety). The article detachment control unit 1315*e* then causes the article B to be detached from the UAV 1 in a case where it is determined that the article B is detachable. Thus, an adverse effect on the article B due to the drop can be avoided.

Here, whether or not the article B is detachable is preferably determined on the basis of the type of the article B. Thus, in a case where the article B is of a type that would be adversely affected by the drop, the drop can be canceled. In this case, for example, the information indicating the type of the article B is acquired from the management server SA by the information acquisition unit 1315*a* and set in the article detachment control unit 1315*e*. For example, in a case where the article B corresponds to a type (category) that can withstand an impact caused by dropping the article B onto the ground (in other words, that is hardly affected by an impact), it is determined that the article B is detachable. Examples of such types include foods, daily necessities, and clothing items. On the other hand, in a case where the type of the article B is an electrical appliance, a fragile object, or the like that is susceptible to impact (In other words, impact-sensitive), it is determined that the article B is not detachable. As described above, because the altitude at the time of dropping the article B becomes higher than usual (in the example of FIG. 10, distance d5 increases), the impact at the time of dropping the article B increases. However, by determining whether or not the article B is detachable (that is, whether or not the drop is possible), damage, failure, and the like of the article B can be suitably prevented by canceling the drop in a case where there would be an adverse effect on the article B.

Moreover, whether or not the article B is detachable may be determined on the basis of the distance from the article B to the ground. Thus, in a case where the distance from the article B to the ground is a distance that would adversely affect the article B, the drop can be canceled. In this case, the distance from the article B to the ground is calculated on the basis of, for example, the feeding amount of the linear member 15 at present, the height of the article, the distance from the UAV 1 to the ground, and so forth. The distance from the UAV 1 to the ground may be measured by, for example, a distance sensor. Then, in a case where the distance from the article B to the ground is less than a predetermined distance (for example, 2 m), it is determined that the article B is detachable. On the other hand, in a case where the distance from the article B to the ground is equal to or greater than a predetermined distance (for example, 2 m), it is determined that the article B is not detachable.

[2. Operation when Detaching the Article B from the UAV 1]

Figure 11:
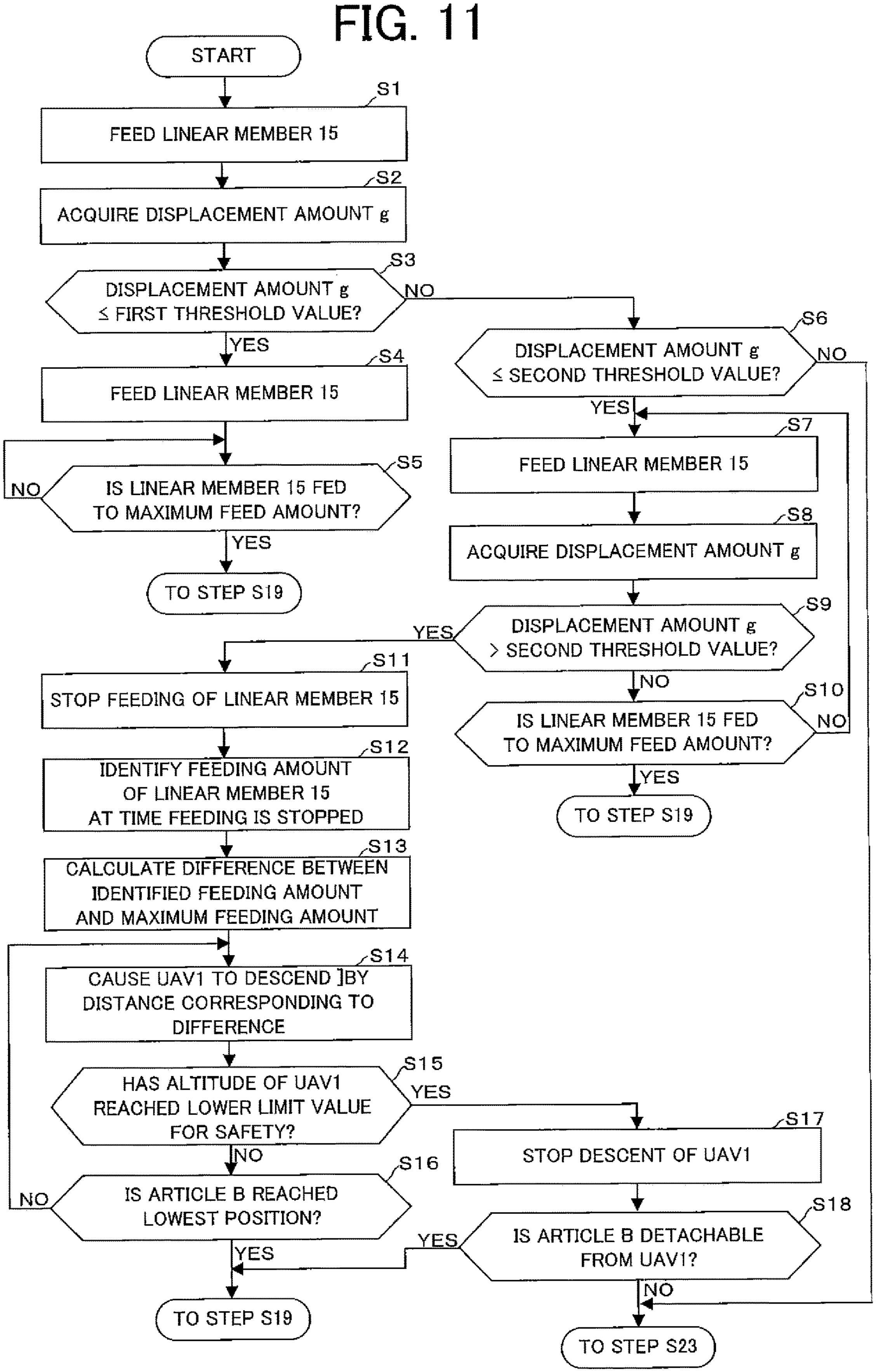
FIG. 11 is flowchart illustrating an example of processing by the control processing unit 1315.
Figure 12:
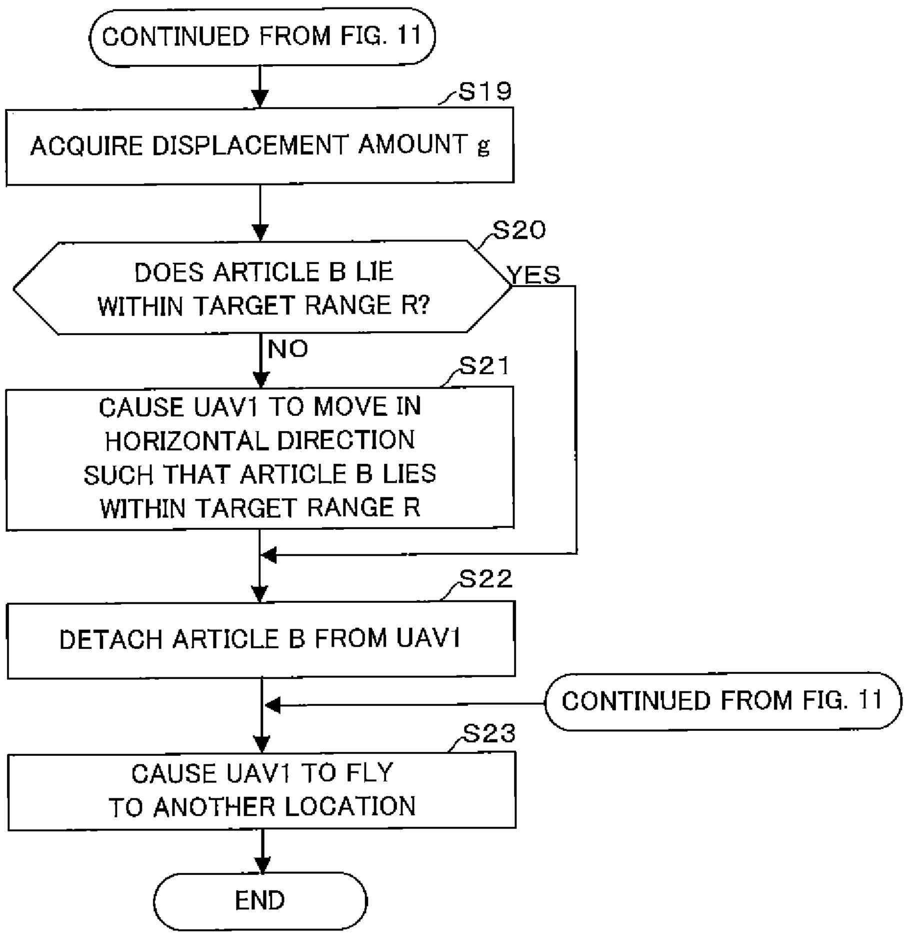
FIG. 12 is flowchart illustrating an example of processing by the control processing unit 1315.

Next, an operation to detach the article B from the UAV 1 will be described with reference to FIGS. 11 and 12. FIGS. 11 and 12 are flowcharts illustrating an example of processing by the control processing unit 1315. The processing illustrated in FIG. 11 is started when the UAV 1 enters the hovering state above the target range R after arriving at the delivery destination. Alternatively, the processing illustrated in FIG. 11 may be started in response to a feed instruction from the recipient of the article B after the UAV 1 arrives at the delivery destination. The feed instruction from the recipient may be received, for example, from a mobile terminal used by the recipient, via the communication unit 1312.

Incidentally, in the operation example described below, a case where the wind force information is the displacement amount g of the article B (hereinafter, simply referred to as the "displacement amount g") is taken as an example.

When the processing illustrated in FIG. 11 is started, the control processing unit 1315 controls the reel 162, using the reel control unit 1315*c*, so as to feed the linear member 15 according to a minimum feeding amount or a midpoint feeding amount (step S1). That is, the reel control unit 1315*c* feeds the linear member 51. As a result, the linear member 15 is fed as far as the article position P1 or P2 illustrated in FIG. 6, for example. Incidentally, in a case where the article B is being held by the article-holding mechanism 17, the control processing unit 1315 controls the movable holder 172 of the article-holding mechanism 17 to cancel the holding of the article B before the processing in step S1.

Next, the control processing unit 1315 acquires, using the information acquisition unit 1315*a*, the displacement amount g detected when the linear member 15 is fed by the minimum feeding amount or the midpoint feeding amount in step S1 (step S2). Here, the displacement amount g when the linear member 15 is fed by a minimum feeding amount or by a midpoint feeding amount is detected by the image analysis unit 1315*b* or the swing angle detection sensor.

Next, the control processing unit 1315 determines whether or not the displacement amount g acquired in step. S2 is equal to or less than the first threshold value (step S3). In a case where it is determined that the displacement amount g is equal to or less than the first threshold value (step S3: YES), the processing advances to step S4. On the other hand, in a case where it is determined that the displacement amount g is not equal to or less than the first threshold value (that is, is greater than the first threshold value) (step S3: NO), the processing advances to step S6.

In step S4, the control processing unit 1315 controls the reel 162, using the reel control unit 1315*c*, so as to feed the linear member 51 at a high speed to the maximum feeding amount. Next, the control processing unit 1315 determines whether or not the linear member 51 is fed to the maximum feeding amount (step S5). In a case where it is determined that the linear member 51 is fed to the maximum feeding amount (step S5: YES), the processing advances to step S19 illustrated in FIG. 12. In this case, for example, the linear member 15 is fed to the article position P3 illustrated in FIG. 6. On the other hand, in a case where it is determined that the linear member 51 is not fed to the maximum feeding amount (step S5: NO), the processing returns to step S5.

In step S6, the control processing unit 1315 determines whether the displacement amount g acquired in step S2 is equal to or less than the second threshold value. In a case where it is determined that the displacement amount g is equal to or less than the second threshold value (step S6: YES), the processing advances to step S7. On the other hand, in a case where it is determined that the displacement amount g is not equal to or less than the second threshold value (that is, is greater than the second threshold value) (step S6: NO), the processing advances to step S23 illustrated in FIG. 12.

In step S7, the control processing unit 1315 controls the reel 162, using the reel control unit 1315*c*, so as to feed the linear member 15 at a low speed, by taking the maximum feeding amount as a target value. Next, the control processing unit 1315 acquires, using the information acquisition unit 1315*a*, the displacement amount g detected immediately after step S7 (step S8). Next, the control processing unit 1315 determines whether or not the displacement amount g acquired in step S8 exceeds the second threshold value (step S9). In a case where it is determined that the displacement amount g does not exceed the second threshold value (step S9: NO), the processing advances to step S10. On the other hand, in a case where it is determined that the displacement amount g exceeds the second threshold value (step S9: YES), the processing advances to step S11.

In step S10, the control processing unit 1315 determines whether or not the linear member 51 is fed to the maximum feeding amount. In a case where it is determined that the linear member 51 is fed to the maximum feeding amount (step S10: YES), the processing advances to step S19 illustrated in FIG. 12. On the other hand, in a case where it is determined that the linear member 51 is not fed to the maximum feeding amount (step S10: NO), the processing returns to step S7.

In step S11, the control processing unit 1315 controls the reel 162 so as to stop feeding the linear member 15. That is, the reel control unit 1315*c* stops feeding the linear member 51. Next, the control processing unit 1315 identifies the feeding amount of the linear member 15 when the feeding is stopped (step S12). For example, the feeding amount measured by the feeding amount measurement sensor is identified. Next, the control processing unit 1315 calculates a difference between the feeding amount identified in step S12 and the maximum feeding amount (step S13). Next, the control processing unit 1315 controls the rotor 111, using the flight control unit 1315*d*, such that the UAV 1 is made to descend by a distance corresponding to the difference calculated in step S13 (step S14). That is, the flight control unit 1315*d* causes the UAV 1 to descend by a distance corresponding to the difference.

Next, the control processing unit 1315 determines whether or not the altitude of the descending UAV 1 has reached the lower limit value for safety (step S15). In a case where it is determined that the altitude of the descending UAV 1 has not reached the lower limit value for safety (step S15: NO), the processing advances to step S16. On the other hand, in a case where it is determined that the altitude of the descending UAV 1 has reached the lower limit value for safety (step S15: YES), the processing advances to step S17.

In step S16, the control processing unit 1315 determines whether or not the article B has reached the lowest position (for example, the article position P3 illustrated in FIG. 6). In a case where it is determined that the article B has not reached the lowest position (step S16: NO), the processing returns to step S14. On the other hand, in a case where it is determined that the article B has reached the lowest position (step S16: YES), the processing advances to step S19 illustrated in FIG. 12.

In step S17, the control processing unit 1315 stops the descent of the UAV 1. Next, the control processing unit 1315 uses the article detachment control unit 1315*e* to determine, on the basis of the type of the article B, for example, whether or not the article B is detachable from the UAV 1 which is hovering after the descent thereof is stopped (step S18). In a case where it is determined that the article B is detachable from the UAV 1 (step S18: YES), the processing advances to step S19 illustrated in FIG. 12. On the other hand, in a case where it is determined that the article B is not detachable from the UAV 1 (step S18: NO), the processing advances to step S23 illustrated in FIG. 12.

Incidentally, the control processing unit 1315 may identify the distance from the article B (for example, the bottom surface of the article B) to the ground before the processing of step S18. In a case where the identified distance is equal to or greater than a predetermined distance (for example, 2 m), the control processing unit 1315 advances to step S18. On the other hand, in a case where the identified distance is less than the predetermined distance (for example, 2 m), the control processing unit 1315 skips step S18, and the processing advances to step S19 illustrated in FIG. 12. As a result, the processing time can be shortened.

In step S19 illustrated in FIG. 12, the control processing unit 1315 acquires, using the information acquisition unit 1315*a*, the displacement amount g detected in the current state. Next, the control processing unit 1315 determines (estimates) whether or not the article B lies within the target range R when the article B has been dropped, on the basis of the displacement amount g acquired in step S19 (step S20). When the article B has been dropped, in a case where it is determined that the article B does not lie within the target range R (that is, at least a portion of the article B is outside the target range R) (step S20: NO), the processing advances to step S21. On the other hand, in a case where it is determined that the article B lies within the target range R (step S20: YES) when the article B has been dropped, the processing advances to step S22.

In step S21, the control processing unit 1315 controls, using the flight control unit 1315*d*, the position of the UAV 1 in the horizontal direction (that is, moves the position in the horizontal direction) such that the article B lies within the target range R, and advances the processing to step S22. Through such control, the UAV 1 moves horizontally by the distance d1 or d2, as illustrated in FIG. 7, for example. Thereafter, the processing advances to step S22.

In step S22, the control processing unit 1315 uses the article detachment control unit 1315*e* to detach the article B from the UAV 1, and advances the processing to step S23. As a result, the detached article B is dropped within the target range R on the ground. In step S23, the control processing unit 1315 causes the UAV 1 to fly to another location (for example, return to the distribution base). Incidentally, in a case where there is, at the delivery destination, a flat space enabling the UAV 1 to land (for example, a take-off and landing port is installed), the control processing unit 1315 may cause the article B to be detached after causing the UAV 1 to land on the space, and then cause the UAV 1 to fly to another location.

As described above, according to the foregoing embodiment, the control device 131 is configured to acquire wind force information relating to the wind strength around the article B when the article B is to be lowered, and, based on the acquired wind force information, control the reel 162 so as to provide the feeding amount of the linear member 15 in dependence on the wind strength. It is therefore possible to reduce the effect of the wind when the article B is to be lowered from the UAV 1. Thus, the article B can be dropped and placed in a designated position, for example.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. The foregoing embodiment is an embodiment of the present invention, and the present invention is not limited to the foregoing embodiment; modifications may be made to various configurations and the like of the foregoing embodiment without departing from the spirit of the present invention, and such cases are also included in the technical scope of the present invention. In the foregoing embodiment, the processing illustrated in FIGS. 11 and 12 is configured to be performed by the control device 131 mounted in the UAV 1, but may instead be configured to be performed by the management server SA communicating with the UAV 1. In this case, the management server SA functions as a control device that controls the reel 162 to lower the article B, acquires wind force information (for example, the displacement amount g of the article B) relating to the wind strength around the article B when the article B is to be lowered, and transmits, to the UAV 1 via the communication network NW, control information for controlling the reel 162 so as to provide the feeding amount of the linear member 15 in dependence on the wind strength on the basis of the wind force information. In this case, the control signal to the reel drive mechanism 164 may be transmitted from the management server SA via the control processing unit 1315 of the UAV 1.

Moreover, in the foregoing embodiment, the configuration is such that control is performed so as to detach (separate) the article B from the UAV 1 before the article B reaches the ground (which may be a rooftop surface of a building), but the present invention is not limited to this configuration. For example, the present invention can also be applied to a configuration wherein control is performed so as to detach the article B from the UAV 1 after the article B reaches the ground (which may be a rooftop surface of a building). In this case, the control device 131 obtains the distance between the article B and the ground when the feeding amount of the linear member 15 is set to an amount corresponding to the wind strength, and lowers the altitude of the UAV 1 such that the article B lands on (reaches) the ground on the basis of the obtained distance. As a result, the article B is detached from the UAV 1 after the article B has landed.

Figure 13:
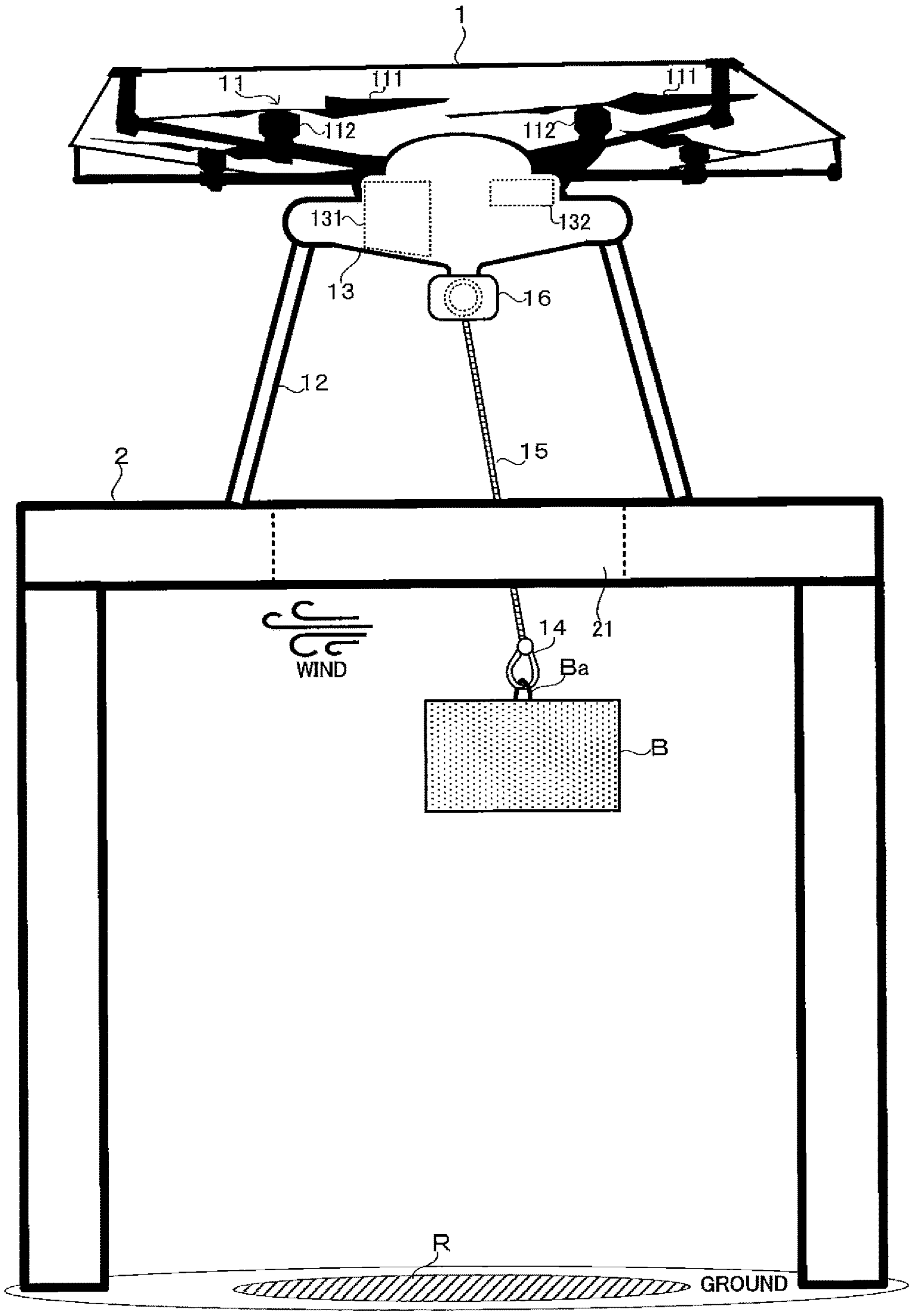
FIG. 13 is a diagram illustrating an aspect in which the linear member 15 is fed in a state where the UAV 1 has landed on a pedestal 2.

Moreover, in the foregoing embodiment, the reel control unit 1315*c* is configured to control the reel 162 so as to provide the feeding amount of the linear member 15 in dependence on the wind strength, in a state where the UAV 1 is hovering. However, the reel control unit 1315*c* may control the reel 162 so as to provide the feeding amount of the linear member 15 in dependence on the wind strength, in a state where the UAV 1 has landed on a pedestal. FIG. 13 is a diagram illustrating an aspect in which the linear member 15 is fed in a state where the UAV 1 has landed on a pedestal 2. An opening 21 through which the article B can pass is formed in the pedestal 2. As illustrated in FIG. 13, even in a state where the UAV 1 has landed on the pedestal 2, the article B suspended by the linear member 15 may be blown by the wind. Therefore, by applying the foregoing embodiment, it is possible to reduce the effect of the wind when the article B is to be lowered from the UAV 1. Incidentally, in the foregoing embodiment, a UAV was described as an example of an unmanned aerial vehicle, but the present invention can also be applied to a flying robot or the like as an example of the unmanned aerial vehicle.

<Note>

[1] A control device according to the present disclosure is configured to control a reel to lower an article from an unmanned aerial vehicle equipped with a mooring member enabling mooring of the article, a linear member connected to the mooring member, and the reel on which the linear member is wound. The control device includes: an acquisition unit configured to acquire information relating to wind strength around the article when the article is to be lowered; and a control unit configured to control the reel, on the basis of the information acquired by the acquisition unit, so as to provide a feeding amount of the linear member in dependence on the wind strength. This makes it possible to reduce the effect of wind when the article is to be lowered from the unmanned aerial vehicle.

[2] In the control device described in [1] above, the acquisition unit is configured to acquire, as the information relating to the wind strength, a displacement amount of the article in a horizontal direction with respect to a vertical direction, taking the reel as a reference, in a state where the article is suspended by the linear member via the mooring member, and the control unit is configured to control the reel, on the basis of the displacement amount, so as to provide the feeding amount of the linear member in dependence on the displacement amount. This makes it possible to perform reel control according to the magnitude with which the article is actually agitated by the wind.

[3] In the control device described in [2] above, the control unit is configured to control the reel such that the feeding amount of the linear member decreases as the displacement amount increases. Thus, the amount of agitation of the article by the wind can be reduced, and as a result, it is possible to prevent an article drop position from lying outside a range constituting a drop target.

[4] In the control device described in [2] or [3] above, the acquisition unit is configured to acquire the displacement amount detected at the time of a second feeding amount of the linear member which is less than a first feeding amount thereof when the article is detached. This makes it possible to acquire the displacement amount of the article while reducing the amount the article is agitated by the wind.

[5] In the control device described in [4] above, the second feeding amount is greater than a feeding amount at which the article starts to be affected by the wind. This makes it possible to acquire an appropriate displacement amount in a position where the article is as close as possible to the ground while reducing the amount of agitation of the article by the wind.

[6] In the control device described in [4] or [5] above, the control unit is configured to control the reel so as to feed the linear member at a first predetermined speed to the first feeding amount in a case where the displacement amount is equal to or less than a first threshold value. Thus, the linear member can be fed until the same reaches the lowest position when the article is detached after it is confirmed that there is a low probability of the article being agitated by the wind.

[7] In the control device described in [6] above, the acquisition unit is configured to acquire the displacement amount detected when the linear member is fed to the first feeding amount, and the control unit is configured to control the position of the unmanned aerial vehicle in the horizontal direction such that the article lies within a range constituting a drop target of the article, on the basis of the displacement amount detected when the linear member is fed to the first feeding amount. This makes it possible to prevent the article drop position from lying outside the range constituting the drop target.

[8] In the control device described in [6] above, the acquisition unit is configured to acquire the displacement amount, which is continuously detected while the linear member is fed from the second feeding amount to the first feeding amount, and in a case where the displacement amount is greater than the first threshold value and equal to or less than a second threshold value, the control unit is configured to control the reel so as to feed the linear member at a second predetermined speed lower than the first predetermined speed and by taking the first feeding amount as a target value, unless the displacement amount exceeds the second threshold value. Thus, when there is a moderate probability of the article being agitated by the wind, the linear member can be fed until the same reaches the lowest position when the article is detached, while preventing the displacement amount of the article from exceeding a second threshold value.

[9] In the control device described in [4] above, the acquisition unit is configured to acquire the displacement amount, which is continuously detected while the linear member is fed from the second feeding amount to the first feeding amount, and in a case where the displacement amount is greater than the first threshold value and equal to or less than a second threshold value, the control unit is configured to control the reel so as to feed the linear member gradually and by taking the first feeding amount as a target value, unless the displacement amount exceeds the second threshold value. Thus, when there is a moderate probability of the article being agitated by the wind, the linear member can be fed until the same reaches the lowest position when the article is detached, while preventing the displacement amount of the article from exceeding a second threshold value.

[10] In the control device described in [8] or [9] above, the control unit is configured to control the position of the unmanned aerial vehicle in the horizontal direction such that the article lies within a range constituting a drop target of the article, on the basis of the displacement amount detected when the linear member is fed to the first feeding amount. Thus, even in a situation where the wind is blowing to some extent, it is possible to prevent the article drop position from lying outside the range constituting the drop target.

[11] In the control device described in any one of [8] to [10] above, the control unit is configured to control the reel so as to stop the feeding of the linear member at the moment when the displacement amount exceeds the second threshold value. This makes it possible to stop the feeding of the linear member before the article is greatly agitated.

[12] In the control device described in above, the control unit is configured to cause the unmanned aerial vehicle in hovering to descend on the basis of a difference between the feeding amount of the linear member when the feeding is stopped and the first feeding amount, in a case where the feeding of the linear member is stopped at a midpoint toward the first feeding amount. This makes it possible to dampen any impact which the article is subjected to at the time of the drop.

[13] In the control device described in above, the control unit is configured to cause the unmanned aerial vehicle to hover in a case where the altitude of the descending unmanned aerial vehicle reaches a lower limit value for safety. The control device further includes a determination unit configured to determine whether or not the article is detachable from the unmanned aerial vehicle whose altitude has reached the lower limit value for safety. Thus, by determining whether or not the article is detachable, the drop can be canceled in a case where the article would be adversely affected.

[14] In the control device described in above, the determination unit is configured to determine whether or not the article is detachable on the basis of a type of the article. Thus, in a case where the article is of a type that would be adversely affected by the drop, the drop can be canceled.

[15] In the control device described in [13] or [14] above, the determination unit is configured to determine whether or not the article is detachable on the basis of a distance from the article to a ground. Thus, in a case where the distance from the article to the ground is a distance that would adversely affect the article, the drop can be canceled.

[16] In the control device described in any one of [13] to [15] above, the control unit is configured to cause the article to be detached from the unmanned aerial vehicle in a case where it is determined by the determination unit that the article is detachable. This makes it possible to avoid an adverse effect on the article.

[17] In the control device described in [4] or [5] above, the control unit is configured to cause the unmanned aerial vehicle to fly to another location without detaching the article in a case where the displacement amount is greater than a second threshold value. This makes it possible to prevent an adverse effect on the article and the article surroundings.

[18] An unmanned aerial vehicle according to the present disclosure includes: a mooring member capable of mooring an article; a linear member connected to the mooring member; a reel around which the linear member is wound; an acquisition unit configured to acquire information relating to wind strength around the article when the article is to be lowered from the unmanned aerial vehicle by controlling the reel; and a control unit configured to control the reel so as to provide a feeding amount of the linear member in dependence on the wind strength, on the basis of the information acquired by the acquisition unit.

[19] A control method according to the present disclosure is executed by a computer for controlling a reel to lower an article from an unmanned aerial vehicle equipped with a mooring member enabling mooring of the article, a linear member connected to the mooring member, and the reel on which the linear member is wound. The control method includes: acquiring information relating to wind strength around the article when the article is to be lowered; and controlling the reel, based on the acquired information, so as to provide a feeding amount of the linear member in dependence on the wind strength.

REFERENCE SIGNS LIST

1 UAV
2 Pedestal
11 Rotor portion
12 Leg portions
13 Body portion
14 Mooring member
15 Linear member
16 Winch
111 Rotors
112 Rotor drive mechanism
131 Control device
132 Battery
161 Attachment portion
162 Reel
163 Rotating shaft
164 Reel drive mechanism
165 Casing
166 Guide
167 Rod
168 Bearing
1311 Positioning unit
1312 Communication unit
1313 Sensor unit
1314 Storage unit
1315 Control processing unit
**1315*a*** Information acquisition unit
**1315*b*** Image analysis unit
**1315*c*** Reel control unit
**1315*d*** Flight control unit
**1315*e*** Article detachment control unit
1631 Engagement member
1641, 1642 Gear
1643 Drive motor

The invention claimed is:

1. A control device configured to control a reel to lower an article from an unmanned aerial vehicle equipped with a mooring member enabling mooring of the article, a linear member connected to the mooring member, and the reel on which the linear member is wound, the control device comprising:

at least one memory configured to store program code; and at least one processor configured to access the program code and operate as instructed by the program code, the program code including:

acquisition code configured to cause the at least one processor to acquire information relating to wind strength around the article when the article is to be lowered, wherein the information relating to wind strength comprises a displacement amount of the article in a horizontal direction with respect to a vertical direction; and control code configured to cause the at least one processor to control the reel, on the basis of the acquired information, so as to provide a feeding amount of the linear member in dependence on the wind strength, wherein the control code is configured to cause the at least one processor to control the reel so as to feed the linear member at a first predetermined speed to a first feeding amount in a case where the displacement amount is equal to or less than a first threshold value.

2. The control device according to claim 1, wherein the control code is configured to cause the at least one processor to control the reel such that the feeding amount of the linear member decreases as the displacement amount increases.

3. The control device according to claim 1, wherein the acquisition code is configured to cause the at least one processor to acquire the displacement amount detected at a time of a second feeding amount of the linear member which is less than a first feeding amount thereof when the article is detached.

4. The control device according to claim 3, wherein the second feeding amount is greater than a minimum feeding amount.

5. The control device according to claim 3, wherein the acquisition code is configured to cause the at least one processor to acquire the displacement amount, which is continuously detected while the linear member is fed from the second feeding amount to the first feeding amount, and wherein, in a case where the displacement amount is greater than the first threshold value and equal to or less than a second threshold value, the control code is configured to cause the at least one processor to control the reel so as to feed the linear member gradually and by taking the first feeding amount as a target value, unless the displacement amount exceeds the second threshold value.

6. The control device according to claim 4, wherein, in a case where the displacement amount is greater than a second threshold value, the control code is configured to cause the at least one processor to cause the unmanned aerial vehicle to fly to another location without detaching the article.

7. The control device according to claim 1, wherein the acquisition code is configured to cause the at least one processor to acquire the displacement amount detected when the linear member is fed to the first feeding amount, and wherein the control code is configured to cause the at least one processor to control the position of the unmanned aerial vehicle in the horizontal direction such that the article lies within a range constituting a drop target of the article, on the basis of the displacement amount detected when the linear member is fed to the first feeding amount.

8. The control device according to claim 1, wherein the acquisition code is configured to cause the at least one processor to acquire the displacement amount, which is continuously detected while the linear member is fed from the second feeding amount to the first feeding amount, and wherein, in a case where the displacement amount is greater than the first threshold value and equal to or less than a second threshold value, the control code is configured to cause the at least one processor to control the reel so as to feed the linear member at a second predetermined speed lower than the first predetermined speed and by taking the first feeding amount as a target value, unless the displacement amount exceeds the second threshold value.

9. The control device according to claim 8, wherein the control code is configured to cause the at least one processor to control the position of the unmanned aerial vehicle in the horizontal direction such that the article lies within a range constituting a drop target of the article, on the basis of the displacement amount detected when the linear member is fed to the first feeding amount.

10. The control device according to claim 8, wherein the control code is configured to cause the at least one processor to control the reel so as to stop the feeding of the linear member at the moment when the displacement amount exceeds the second threshold value.

11. The control device according to claim 10, wherein, in a case where the feeding of the linear member is stopped at a midpoint toward the first feeding amount, the control code is configured to cause the at least one processor to cause the unmanned aerial vehicle to descend on the basis of a difference between the feeding amount of the linear member when the feeding is stopped and the first feeding amount.

12. The control device according to claim 11, wherein, in a case where an altitude of the descending unmanned aerial vehicle reaches a lower limit value for safety, the control code is configured to cause the at least one processor to cause the unmanned aerial vehicle to hover, the program code including:

determination code configured to cause the at least one processor to determine whether or not the article is detachable from the unmanned aerial vehicle whose altitude has reached the lower limit value for safety.

13. The control device according to claim 12, wherein the determination code is configured to cause the at least one processor to determine whether or not the article is detachable on the basis of a type of the article.

14. The control device according to claim 12, wherein the determination code is configured to cause the at least one processor to determine whether or not the article is detachable on the basis of a distance from the article to a ground.

15. The control device according to claim 12, wherein, in response to determining that the article is detachable, the control code is configured to cause the at least one processor to cause the article to be detached from the unmanned aerial vehicle.

16. An unmanned aerial vehicle comprising:

a mooring member capable of mooring an article;

a linear member connected to the mooring member;

a reel around which the linear member is wound;

at least one memory configured to store program code; and at least one processor configured to access the program code and operate as instructed by the program code, the program code including:

acquisition code configured to cause the at least one processor to acquire information relating to wind strength around the article when the article is to be lowered from the unmanned aerial vehicle by controlling the reel, wherein the information relating to wind strength comprises a displacement amount of the article in a horizontal direction with respect to a vertical direction; and control code configured to cause the at least one processor to control the reel so as to provide a feeding amount of the linear member in dependence on the wind strength, on the basis of the acquired information, wherein the control code is configured to cause the at least one processor to control the reel so as to feed the linear member at a first predetermined speed to a first feeding amount in a case where the displacement amount is equal to or less than a first threshold value.

17. A control method executed by a computer for controlling a reel to lower an article from an unmanned aerial vehicle equipped with a mooring member enabling mooring of the article, a linear member connected to the mooring member, and the reel on which the linear member is wound, the control method comprising:

acquiring information relating to wind strength around the article when the article is to be lowered, wherein the information relating to wind strength comprises a displacement amount of the article in a horizontal direction with respect to a vertical direction;

controlling the reel, based on the acquired information, so as to provide a feeding amount of the linear member in dependence on the wind strength;

controlling the reel so as to feed the linear member at a first predetermined speed to a first feeding amount in a case where the displacement amount is equal to or less than a first threshold value.

* * * * *